United States Patent
Nagashima

(10) Patent No.: US 9,503,603 B2
(45) Date of Patent: Nov. 22, 2016

(54) READING APPARATUS, CORRECTION VALUE CALCULATING METHOD AND INK JET RECORDING APPARATUS

(71) Applicant: FUJIFILM Corporation, Tokyo (JP)

(72) Inventor: Kanji Nagashima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/067,229

(22) Filed: Mar. 11, 2016

(65) Prior Publication Data
US 2016/0277622 A1    Sep. 22, 2016

(30) Foreign Application Priority Data

Mar. 16, 2015    (JP) .................................. 2015-052211

(51) Int. Cl.
| | |
|---|---|
| H04N 1/40 | (2006.01) |
| H04N 1/024 | (2006.01) |
| H04N 1/00 | (2006.01) |
| H04N 1/21 | (2006.01) |
| H04N 1/034 | (2006.01) |
| H04N 1/60 | (2006.01) |

(52) U.S. Cl.
CPC ...... *H04N 1/02418* (2013.01); *H04N 1/00798* (2013.01); *H04N 1/034* (2013.01); *H04N 1/21* (2013.01); *H04N 2201/0081* (2013.01)

(58) Field of Classification Search
CPC ..................... H04N 1/02418; H04N 1/00798; H04N 1/21; H04N 1/034; H04N 2201/0081
USPC ........................................... 358/1.1, 1.9, 461
See application file for complete search history.

(56) References Cited

U.S. PATENT DOCUMENTS

| | | | | |
|---|---|---|---|---|
| 2011/0286055 A1* | 11/2011 | Hashizume | .......... | H04N 1/1938 358/482 |
| 2015/0070734 A1* | 3/2015 | Hagiwara | ............ | H04N 1/3878 358/447 |

FOREIGN PATENT DOCUMENTS

JP    2003-219124 A    7/2003

* cited by examiner

*Primary Examiner* — Douglas Tran
(74) *Attorney, Agent, or Firm* — Studebaker & Brackett PC

(57) ABSTRACT

The correction value calculating method of the reading apparatus includes a reading value acquiring step of acquiring reading values at respective pixels for respective reading positions at both ends of a reading range of the reference member and reading values at respective two or more pixels for respective reading positions in the reading range except the reading positions, and reading values for respective two or more reading positions at respective pixels while relatively moving an image pickup element in which a plurality of pixels are arranged along a first direction and the reference member which becomes a reference for shading correction, and a correction value calculating step of calculating a correction value for shading correction based on the acquired reading values.

13 Claims, 29 Drawing Sheets

FIG.5

| READING TIME | PIXEL | | | | | | | | | | | | | | | | |
|---|---|---|---|---|---|---|---|---|---|---|---|---|---|---|---|---|---|
| | PX$_1$ | PX$_2$ | PX$_3$ | PX$_4$ | PX$_5$ | PX$_6$ | PX$_7$ | PX$_8$ | PX$_9$ | PX$_{10}$ | PX$_{11}$ | PX$_{12}$ | PX$_{13}$ | PX$_{14}$ | PX$_{15}$ | PX$_{16}$ | PX$_{17}$ |
| T$_1$ | LC$_1$ | LC$_2$ | LC$_3$ | LC$_4$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ |
| T$_2$ | LC$_2$ | LC$_3$ | LC$_4$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ |
| T$_3$ | LC$_3$ | LC$_4$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ |
| T$_4$ | LC$_4$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ |
| T$_5$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ |
| T$_6$ | LC$_6$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ | LC$_{22}$ |
| T$_7$ | LC$_7$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ | LC$_{22}$ | LC$_{23}$ |
| T$_8$ | LC$_8$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ | LC$_{22}$ | LC$_{23}$ | LC$_{24}$ |
| T$_9$ | LC$_9$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ | LC$_{22}$ | LC$_{23}$ | LC$_{24}$ | LC$_{25}$ |
| T$_{10}$ | LC$_{10}$ | LC$_{11}$ | LC$_{12}$ | LC$_{13}$ | LC$_{14}$ | LC$_{15}$ | LC$_{16}$ | LC$_{17}$ | LC$_{18}$ | LC$_{19}$ | LC$_{20}$ | LC$_{21}$ | LC$_{22}$ | LC$_{23}$ | LC$_{24}$ | LC$_{25}$ | LC$_{26}$ |

FIG. 6

| READING TIME | PX$_1$ | PX$_2$ | PX$_3$ | PX$_4$ | PX$_5$ | PX$_6$ | PX$_7$ | PX$_8$ | PX$_9$ | PX$_{10}$ | PX$_{11}$ | PX$_{12}$ | PX$_{13}$ | PX$_{14}$ | PX$_{15}$ | PX$_{16}$ | PX$_{17}$ |
|---|---|---|---|---|---|---|---|---|---|---|---|---|---|---|---|---|---|
| T$_1$ | D(1,1) | D(2,2) | D(3,3) | D(4,4) | D(5,5) | D(6,6) | D(7,7) | D(8,8) | D(9,9) | D(10,10) | D(11,11) | D(12,12) | D(13,13) | D(14,14) | D(15,15) | D(16,16) | D(17,17) |
| T$_2$ | D(1,2) | D(2,3) | D(3,4) | D(4,5) | D(5,6) | D(6,7) | D(7,8) | D(8,9) | D(9,10) | D(10,11) | D(11,12) | D(12,13) | D(13,14) | D(14,15) | D(15,16) | D(16,17) | D(17,18) |
| T$_3$ | D(1,3) | D(2,4) | D(3,5) | D(4,6) | D(5,7) | D(6,8) | D(7,9) | D(8,10) | D(9,11) | D(10,12) | D(11,13) | D(12,14) | D(13,15) | D(14,16) | D(15,17) | D(16,18) | D(17,19) |
| T$_4$ | D(1,4) | D(2,5) | D(3,6) | D(4,7) | D(5,8) | D(6,9) | D(7,10) | D(8,11) | D(9,12) | D(10,13) | D(11,14) | D(12,15) | D(13,16) | D(14,17) | D(15,18) | D(16,19) | D(17,20) |
| T$_5$ | D(1,5) | D(2,6) | D(3,7) | D(4,8) | D(5,9) | D(6,10) | D(7,11) | D(8,12) | D(9,13) | D(10,14) | D(11,15) | D(12,16) | D(13,17) | D(14,18) | D(15,19) | D(16,20) | D(17,21) |
| T$_6$ | D(1,6) | D(2,7) | D(3,8) | D(4,9) | D(5,10) | D(6,11) | D(7,12) | D(8,13) | D(9,14) | D(10,15) | D(11,16) | D(12,17) | D(13,18) | D(14,19) | D(15,20) | D(16,21) | D(17,22) |
| T$_7$ | D(1,7) | D(2,8) | D(3,9) | D(4,10) | D(5,11) | D(6,12) | D(7,13) | D(8,14) | D(9,15) | D(10,16) | D(11,17) | D(12,18) | D(13,19) | D(14,20) | D(15,21) | D(16,22) | D(17,23) |
| T$_8$ | D(1,8) | D(2,9) | D(3,10) | D(4,11) | D(5,12) | D(6,13) | D(7,14) | D(8,15) | D(9,16) | D(10,17) | D(11,18) | D(12,19) | D(13,20) | D(14,21) | D(15,22) | D(16,23) | D(17,24) |
| T$_9$ | D(1,9) | D(2,10) | D(3,11) | D(4,12) | D(5,13) | D(6,14) | D(7,15) | D(8,16) | D(9,17) | D(10,18) | D(11,19) | D(12,20) | D(13,21) | D(14,22) | D(15,23) | D(16,24) | D(17,25) |
| T$_{10}$ | D(1,10) | D(2,11) | D(3,12) | D(4,13) | D(5,14) | D(6,15) | D(7,16) | D(8,17) | D(9,18) | D(10,19) | D(11,20) | D(12,21) | D(13,22) | D(14,23) | D(15,24) | D(16,25) | D(17,26) |

PIXEL

FIG.7

REFLECTANCE UNEVENNESS SET VALUE: 5[%p-p]

| READING POSITION | $LC_1$ | $LC_2$ | $LC_3$ | $LC_4$ | $LC_5$ | $LC_6$ | $LC_7$ | $LC_8$ | $LC_9$ | $LC_{10}$ | $LC_{11}$ | $LC_{12}$ | $LC_{13}$ | $LC_{14}$ | AVERAGE [%] |
|---|---|---|---|---|---|---|---|---|---|---|---|---|---|---|---|
| REFLECTANCE [%] | 101.34 | 100.58 | 99.03 | 99.48 | 102.14 | 97.56 | 99.80 | 101.98 | 100.65 | 99.11 | 101.29 | 99.54 | 99.16 | 97.87 | 99.97 |

FIG.8A

| | TARGET VALUE |
|---|---|
| | 200 |

FIG.8B

SENSITIVITY VARIATION SET VALUE: 0.4[p-p]

| PIXEL | $PX_1$ | $PX_2$ | $PX_3$ | $PX_4$ | $PX_5$ | $PX_6$ | $PX_7$ | $PX_8$ | $PX_9$ | $PX_{10}$ |
|---|---|---|---|---|---|---|---|---|---|---|
| OVERALL SENSITIVITY | 0.859 | 1.001 | 1.156 | 1.016 | 1.096 | 0.888 | 1.164 | 1.109 | 1.088 | 1.054 |
| IDEAL CORRECTION COEFFICIENT | 2.329 | 1.998 | 1.730 | 1.968 | 1.826 | 2.254 | 1.719 | 1.805 | 1.839 | 1.898 |

FIG.10

| READING TIME | PIXEL | | | | | | | | | |
|---|---|---|---|---|---|---|---|---|---|---|
| | $PX_1$ | $PX_2$ | $PX_3$ | $PX_4$ | $PX_5$ | $PX_6$ | $PX_7$ | $PX_8$ | $PX_9$ | $PX_{10}$ |
| $T_1$ | 0.859 | 1.001 | 1.156 | 1.016 | 1.096 | 0.888 | 1.164 | 1.109 | 1.088 | 1.054 |
| $T_2$ | 0.859 | 1.001 | 1.156 | 1.016 | 1.096 | 0.888 | 1.164 | 1.109 | 1.088 | 1.054 |
| $T_3$ | 0.859 | 1.001 | 1.156 | 1.016 | 1.096 | 0.888 | 1.164 | 1.109 | 1.088 | 1.054 |
| $T_4$ | 0.859 | 1.001 | 1.156 | 1.016 | 1.096 | 0.888 | 1.164 | 1.109 | 1.088 | 1.054 |
| $T_5$ | 0.859 | 1.001 | 1.156 | 1.016 | 1.096 | 0.888 | 1.164 | 1.109 | 1.088 | 1.054 |

FIG.11

| READING TIME | | PIXEL | | | | | | | | | | |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ |
| | $T_1$ | 101.3 | 100.6 | 99.0 | 99.5 | 102.1 | 97.6 | 99.8 | 102.0 | 100.6 | 99.1 |
| | $T_2$ | 100.6 | 99.0 | 99.5 | 102.1 | 97.6 | 99.8 | 102.0 | 100.6 | 99.1 | 101.3 |
| | $T_3$ | 99.0 | 99.5 | 102.1 | 97.6 | 99.8 | 102.0 | 100.6 | 99.1 | 101.3 | 99.5 |
| | $T_4$ | 99.5 | 102.1 | 97.6 | 99.8 | 102.0 | 100.6 | 99.1 | 101.3 | 99.5 | 99.2 |
| | $T_5$ | 102.1 | 97.6 | 99.8 | 102.0 | 100.6 | 99.1 | 101.3 | 99.5 | 99.2 | 97.9 |

FIG.12

| READING TIME | | PIXEL | | | | | | | | | | AVERAGE OF AVERAGE VALUES |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| | $T_1$ | 87.1 | 100.7 | 114.5 | 101.1 | 111.9 | 86.6 | 116.1 | 113.1 | 109.5 | 104.5 | |
| | $T_2$ | 86.4 | 99.2 | 115.0 | 103.8 | 106.9 | 88.6 | 118.7 | 111.6 | 107.8 | 106.8 | |
| | $T_3$ | 85.1 | 99.6 | 118.1 | 99.2 | 109.4 | 90.5 | 117.1 | 109.9 | 110.2 | 104.9 | |
| | $T_4$ | 85.5 | 102.3 | 112.8 | 101.4 | 111.7 | 89.3 | 115.3 | 112.3 | 108.3 | 104.5 | |
| | $T_5$ | 87.8 | 97.7 | 115.4 | 103.7 | 110.3 | 88.0 | 117.9 | 110.4 | 107.9 | 103.2 | |
| | AVERAGE VALUE | 86.36 | 99.90 | 115.16 | 101.84 | 110.04 | 88.59 | 117.01 | 111.43 | 108.74 | 104.77 | 104.38 |
| | TEMPORAL CORRECTION COEFFICIENT OF EACH PIXEL | 2.316 | 2.002 | 1.737 | 1.964 | 1.818 | 2.258 | 1.709 | 1.795 | 1.839 | 1.909 | AVERAGE 1.935 |
| | RATIO WITH RESPECT TO IDEAL CORRECTION COEFFICIENT | 0.995 | 1.002 | 1.004 | 0.998 | 0.995 | 1.001 | 0.994 | 0.995 | 1.000 | 1.006 | ROOT-MEAN-SQUARE 0.9990 |

FIG.13

| READING TIME | | PIXEL | | | | | | | | | | AVERAGE OF AVERAGE VALUES |
|---|---|---|---|---|---|---|---|---|---|---|---|---|
| | | PX$_1$ | PX$_2$ | PX$_3$ | PX$_4$ | PX$_5$ | PX$_6$ | PX$_7$ | PX$_8$ | PX$_9$ | PX$_{10}$ | |
| | T$_1$ | 201.6 | 201.7 | 198.8 | 198.6 | 203.4 | 195.5 | 198.5 | 202.9 | 201.4 | 199.4 | |
| | T$_2$ | 200.1 | 198.5 | 199.7 | 203.9 | 194.3 | 200.0 | 202.8 | 200.3 | 198.3 | 203.8 | |
| | T$_3$ | 197.0 | 199.4 | 205.1 | 194.7 | 198.8 | 204.3 | 200.2 | 197.2 | 202.7 | 200.3 | |
| | T$_4$ | 197.9 | 204.8 | 195.9 | 199.2 | 203.1 | 201.7 | 197.1 | 201.5 | 199.2 | 199.5 | |
| | T$_5$ | 203.2 | 195.6 | 200.4 | 203.6 | 200.4 | 198.6 | 201.4 | 198.1 | 198.4 | 196.9 | |
| AVERAGE VALUE | | 200.00 | 200.00 | 200.00 | 200.00 | 200.00 | 200.00 | 200.00 | 200.00 | 200.00 | 200.00 | 200.00 |

FIG.14

| READING POSITION | $LC_1$ | $LC_2$ | $LC_3$ | $LC_4$ | $LC_5$ | $LC_6$ | $LC_7$ | $LC_8$ | $LC_9$ | $LC_{10}$ | $LC_{11}$ | $LC_{12}$ | $LC_{13}$ | $LC_{14}$ | AVERAGE OF AVERAGE VALUES |
|---|---|---|---|---|---|---|---|---|---|---|---|---|---|---|---|
| READING POSITION AVERAGE VALUE | 201.6 | 200.9 | 198.1 | 198.9 | 204.1 | 195.2 | 199.4 | 203.3 | 200.8 | 198.1 | 202.4 | 199.2 | 199.0 | 196.9 | 199.9 |
| RATIO OF REFLECTANCE | 1.0090 | 1.0052 | 0.9914 | 0.9953 | 1.0212 | 0.9767 | 0.9975 | 1.0174 | 1.0046 | 0.9914 | 1.0126 | 0.9966 | 0.9956 | 0.9853 | |
| REFLECTANCE ESTIMATION [%] | 100.90 | 100.52 | 99.14 | 99.53 | 102.12 | 97.67 | 99.75 | 101.74 | 100.46 | 99.14 | 101.26 | 99.66 | 99.56 | 98.53 | AVERAGE OF ABSOLUTE VALUES [%] |
| DIFFERENCE WITH TRUE REFLECTANCE [%] | -0.48 | -0.10 | 0.08 | 0.02 | -0.06 | 0.08 | -0.08 | -0.27 | -0.22 | -0.01 | -0.07 | 0.09 | 0.37 | 0.63 | 0.182 |

FIG.15

| READING TIME | | PIXEL | | | | | | | | | | |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| | $T_1$ | 86.3 | 100.2 | 115.5 | 101.6 | 109.6 | 88.7 | 116.4 | 111.1 | 109.0 | 105.4 | |
| | $T_2$ | 86.0 | 100.0 | 115.6 | 101.7 | 109.4 | 88.8 | 116.6 | 111.1 | 108.8 | 105.4 | |
| | $T_3$ | 85.8 | 100.1 | 115.6 | 101.5 | 109.6 | 89.0 | 116.6 | 110.8 | 108.8 | 105.3 | |
| | $T_4$ | 85.9 | 100.2 | 115.5 | 101.7 | 109.8 | 88.9 | 116.3 | 110.9 | 108.7 | 105.0 | |
| | $T_5$ | 85.9 | 100.0 | 115.7 | 101.9 | 109.8 | 88.7 | 116.4 | 110.7 | 108.4 | 104.7 | |
| | AVERAGE VALUE | 85.98 | 100.10 | 115.57 | 101.67 | 109.65 | 88.81 | 116.46 | 110.93 | 108.72 | 105.16 | AVERAGE OF AVERAGE VALUES 104.30 |
| | TEMPORAL CORRECTION COEFFICIENT OF EACH PIXEL | 2.326 | 1.998 | 1.731 | 1.967 | 1.824 | 2.252 | 1.717 | 1.803 | 1.840 | 1.902 | AVERAGE 1.936 |
| | RATIO WITH RESPECT TO IDEAL CORRECTION COEFFICIENT | 0.999 | 1.000 | 1.000 | 0.999 | 0.999 | 0.999 | 0.999 | 0.999 | 1.000 | 1.002 | ROOT-MEAN-SQUARE 0.9997 |
| | RATIO WITH PREVIOUS TEMPORAL CORRECTION COEFFICIENT | 1.0044 | 0.9980 | 0.9964 | 1.0017 | 1.0035 | 0.9976 | 1.0047 | 1.0045 | 1.0002 | 0.9963 | ROOT-MEAN-SQUARE OF RATIO WITH RESPECT TO PREVIOUS CORRECTION COEFFICIENT 1.00074 |

FIG.16

| READING TIME | | PIXEL | | | | | | | | | | AVERAGE OF AVERAGE VALUES |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| | $T_1$ | 200.7 | 200.2 | 199.9 | 199.8 | 199.9 | 199.6 | 199.9 | 200.3 | 200.5 | 200.4 | |
| | $T_2$ | 200.0 | 199.8 | 200.0 | 200.0 | 199.6 | 200.0 | 200.3 | 200.2 | 200.1 | 200.5 | |
| | $T_3$ | 199.6 | 200.0 | 200.1 | 199.7 | 199.9 | 200.3 | 200.2 | 199.8 | 200.2 | 200.2 | |
| | $T_4$ | 199.7 | 200.1 | 199.9 | 200.0 | 200.3 | 200.2 | 199.8 | 199.9 | 199.9 | 199.7 | |
| | $T_5$ | 199.9 | 199.9 | 200.2 | 200.4 | 200.2 | 199.8 | 199.9 | 199.6 | 199.3 | 199.1 | |
| | AVERAGE VALUE | 200.00 | 200.00 | 200.00 | 200.00 | 200.00 | 200.00 | 200.00 | 200.00 | 200.00 | 200.00 | 200.00 |

FIG.17

| READING POSITION | LC₁ | LC₂ | LC₃ | LC₄ | LC₅ | LC₆ | LC₇ | LC₈ | LC₉ | LC₁₀ | LC₁₁ | LC₁₂ | LC₁₃ | LC₁₄ | AVERAGE OF AVERAGE VALUES |
|---|---|---|---|---|---|---|---|---|---|---|---|---|---|---|---|
| READING POSITION AVERAGE VALUE | 200.7 | 200.1 | 199.8 | 199.9 | 200.0 | 199.7 | 200.0 | 200.3 | 200.3 | 200.0 | 200.1 | 199.9 | 199.5 | 199.1 | 200.0 |
| RATIO OF REFLECTANCE | 1.0039 | 1.0006 | 0.9990 | 0.9996 | 1.0002 | 0.9989 | 1.0002 | 1.0018 | 1.0015 | 1.0001 | 1.0009 | 0.9998 | 0.9977 | 0.9958 | |
| REFLECTANCE ESTIMATION [%] | 101.3 | 100.6 | 99.0 | 99.5 | 102.1 | 97.6 | 99.8 | 101.9 | 100.6 | 99.1 | 101.3 | 99.6 | 99.3 | 98.1 | AVERAGE OF ABSOLUTE VALUES [%] |
| DIFFERENCE WITH TRUE REFLECTANCE [%] | -0.09 | -0.03 | -0.01 | -0.02 | -0.03 | -0.03 | -0.06 | -0.08 | -0.06 | 0.00 | 0.02 | 0.07 | 0.14 | 0.22 | 0.062 |

FIG.18

| READING TIME | PIXEL | | | | | | | | | | | |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| | $T_1$ | 86.0 | 100.1 | 115.6 | 101.6 | 109.6 | 88.8 | 116.4 | 110.9 | 108.8 | 105.4 | |
| | $T_2$ | 85.9 | 100.1 | 115.6 | 101.6 | 109.6 | 88.8 | 116.4 | 110.9 | 108.8 | 105.4 | |
| | $T_3$ | 85.9 | 100.1 | 115.6 | 101.6 | 109.6 | 88.8 | 116.4 | 110.8 | 108.7 | 105.3 | |
| | $T_4$ | 85.9 | 100.1 | 115.6 | 101.7 | 109.6 | 88.8 | 116.3 | 110.8 | 108.7 | 105.2 | |
| | $T_5$ | 85.9 | 100.1 | 115.6 | 101.7 | 109.6 | 88.7 | 116.3 | 110.8 | 108.6 | 105.1 | |
| | AVERAGE VALUE | 85.92 | 100.14 | 115.62 | 101.65 | 109.59 | 88.76 | 116.36 | 110.84 | 108.72 | 105.28 | AVERAGE OF AVERAGE VALUES 104.29 |
| | TEMPORAL CORRECTION COEFFICIENT OF EACH PIXEL | 2.328 | 1.997 | 1.730 | 1.968 | 1.825 | 2.253 | 1.719 | 1.804 | 1.840 | 1.900 | AVERAGE 1.936 |
| | RATIO WITH RESPECT TO IDEAL CORRECTION COEFFICIENT | 1.000 | 1.000 | 1.000 | 1.000 | 0.999 | 1.000 | 1.000 | 1.000 | 1.000 | 1.001 | ROOT-MEAN-SQUARE 0.9998 |
| | RATIO WITH PREVIOUS TEMPORAL CORRECTION COEFFICIENT | 1.0007 | 0.9997 | 0.9996 | 1.0001 | 1.0005 | 1.0005 | 1.0009 | 1.0008 | 1.0000 | 0.9988 | ROOT-MEAN-SQUARE OF RATIO WITH RESPECT TO PREVIOUS CORRECTION COEFFICIENT 1.00017 |

FIG.19

| | | PIXEL | | | | | | | | | | AVERAGE OF AVERAGE VALUES |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| READING TIME | $T_1$ | 200.1 | 200.0 | 200.0 | 199.9 | 200.0 | 200.0 | 200.0 | 200.1 | 200.2 | 200.2 | |
| | $T_2$ | 200.0 | 200.0 | 200.0 | 200.0 | 200.0 | 200.0 | 200.1 | 200.1 | 200.1 | 200.1 | |
| | $T_3$ | 200.0 | 200.0 | 200.0 | 200.0 | 200.0 | 200.1 | 199.9 | 200.0 | 200.0 | 200.0 | |
| | $T_4$ | 200.0 | 200.0 | 200.0 | 200.0 | 200.1 | 200.0 | 199.9 | 199.9 | 199.9 | 199.9 | |
| | $T_5$ | 200.0 | 200.0 | 200.1 | 200.1 | 200.0 | 199.9 | 199.9 | 199.8 | 199.8 | 199.7 | |
| | AVERAGE VALUE | 200.00 | 200.00 | 200.00 | 200.00 | 200.00 | 200.00 | 200.00 | 200.00 | 200.00 | 200.00 | 200.00 |

FIG.20

| READING POSITION | LC₁ | LC₂ | LC₃ | LC₄ | LC₅ | LC₆ | LC₇ | LC₈ | LC₉ | LC₁₀ | LC₁₁ | LC₁₂ | LC₁₃ | LC₁₄ | AVERAGE OF AVERAGE VALUES |
|---|---|---|---|---|---|---|---|---|---|---|---|---|---|---|---|
| READING POSITION AVERAGE VALUE | 200.1 | 200.0 | 200.0 | 200.0 | 200.0 | 200.0 | 200.0 | 200.1 | 200.1 | 200.0 | 200.0 | 199.9 | 199.8 | 199.7 | 200.0 |
| RATIO OF REFLECTANCE | 1.0006 | 1.0001 | 0.9999 | 0.9999 | 1.0000 | 1.0000 | 1.0003 | 1.0005 | 1.0005 | 1.0001 | 1.0001 | 0.9998 | 0.9993 | 0.9988 | |
| REFLECTANCE ESTIMATION [%] | 101.3 | 100.6 | 99.0 | 99.5 | 102.1 | 97.6 | 99.8 | 102.0 | 100.7 | 99.2 | 101.4 | 99.6 | 99.3 | 98.0 | AVERAGE OF ABSOLUTE VALUES [%] |
| DIFFERENCE WITH TRUE REFLECTANCE [%] | -0.03 | -0.02 | -0.02 | -0.03 | -0.03 | -0.03 | -0.03 | -0.03 | -0.01 | 0.02 | 0.03 | 0.05 | 0.07 | 0.10 | 0.035 |

FIG.21

| READING TIME | | PIXEL | | | | | | | | | | | |
|---|---|---|---|---|---|---|---|---|---|---|---|---|---|
| | | PX₁ | PX₂ | PX₃ | PX₄ | PX₅ | PX₆ | PX₇ | PX₈ | PX₉ | PX₁₀ | | |
| | T₁ | 85.9 | 100.1 | 115.6 | 101.6 | 109.6 | 88.8 | 116.4 | 110.9 | 108.8 | 105.4 | | |
| | T₂ | 85.9 | 100.1 | 115.6 | 101.6 | 109.6 | 88.8 | 116.3 | 110.8 | 108.7 | 105.3 | | |
| | T₃ | 85.9 | 100.1 | 115.6 | 101.6 | 109.6 | 88.7 | 116.3 | 110.8 | 108.7 | 105.3 | | |
| | T₄ | 85.9 | 100.1 | 115.6 | 101.6 | 109.6 | 88.7 | 116.3 | 110.8 | 108.7 | 105.3 | | |
| | T₅ | 85.9 | 100.1 | 115.6 | 101.6 | 109.6 | 88.7 | 116.3 | 110.8 | 108.7 | 105.3 | | |
| AVERAGE VALUE | | 85.91 | 100.14 | 115.61 | 101.64 | 109.57 | 88.74 | 116.32 | 110.81 | 108.72 | 105.32 | AVERAGE OF AVERAGE VALUES | 104.28 |
| TEMPORAL CORRECTION COEFFICIENT OF EACH PIXEL | | 2.328 | 1.997 | 1.730 | 1.968 | 1.825 | 2.254 | 1.719 | 1.805 | 1.840 | 1.899 | AVERAGE | 1.936 |
| RATIO WITH RESPECT TO IDEAL CORRECTION COEFFICIENT | | 1.000 | 1.000 | 1.000 | 1.000 | 1.000 | 1.000 | 1.000 | 1.000 | 1.000 | 1.001 | ROOT-MEAN-SQUARE | 0.9999 |
| RATIO WITH PREVIOUS TEMPORAL CORRECTION COEFFICIENT | | 1.0001 | 1.0000 | 1.0000 | 1.0002 | 1.0003 | 1.0003 | 1.0003 | 1.0002 | 1.0000 | 0.9996 | ROOT-MEAN-SQUARE OF RATIO WITH RESPECT TO PREVIOUS CORRECTION COEFFICIENT | 1.00010 |

FIG.22

| READING TIME | | PIXEL | | | | | | | | | | AVERAGE OF AVERAGE VALUES |
|---|---|---|---|---|---|---|---|---|---|---|---|---|
| | | PX$_1$ | PX$_2$ | PX$_3$ | PX$_4$ | PX$_5$ | PX$_6$ | PX$_7$ | PX$_8$ | PX$_9$ | PX$_{10}$ | |
| | T$_1$ | 200.0 | 200.0 | 200.0 | 200.0 | 200.0 | 200.0 | 200.1 | 200.1 | 200.1 | 200.1 | |
| | T$_2$ | 200.0 | 200.0 | 200.0 | 200.0 | 200.0 | 200.0 | 200.0 | 200.0 | 200.0 | 200.0 | |
| | T$_3$ | 200.0 | 200.0 | 200.0 | 200.0 | 200.0 | 200.0 | 200.0 | 200.0 | 200.0 | 200.0 | |
| | T$_4$ | 200.0 | 200.0 | 200.0 | 200.0 | 200.0 | 200.0 | 200.0 | 200.0 | 200.0 | 200.0 | |
| | T$_5$ | 200.0 | 200.0 | 200.0 | 200.0 | 200.0 | 199.9 | 199.9 | 199.9 | 199.9 | 199.9 | |
| | AVERAGE VALUE | 200.00 | 200.00 | 200.00 | 200.00 | 200.00 | 200.00 | 200.00 | 200.00 | 200.00 | 200.00 | 200.00 |

FIG.23

| READING POSITION | LC₁ | LC₂ | LC₃ | LC₄ | LC₅ | LC₆ | LC₇ | LC₈ | LC₉ | LC₁₀ | LC₁₁ | LC₁₂ | LC₁₃ | LC₁₄ | AVERAGE OF AVERAGE VALUES |
|---|---|---|---|---|---|---|---|---|---|---|---|---|---|---|---|
| READING POSITION AVERAGE VALUE | 200.0 | 200.0 | 200.0 | 200.0 | 200.0 | 200.0 | 200.0 | 200.0 | 200.0 | 200.0 | 200.0 | 200.0 | 199.9 | 199.9 | 200.0 |
| RATIO OF REFLECTANCE | 1.0001 | 1.0000 | 1.0000 | 1.0000 | 1.0001 | 1.0001 | 1.0002 | 1.0002 | 1.0002 | 1.0000 | 1.0000 | 0.9999 | 0.9997 | 0.9996 | |
| REFLECTANCE ESTIMATION [%] | 101.4 | 100.6 | 99.0 | 99.5 | 102.2 | 97.6 | 99.8 | 102.0 | 100.7 | 99.2 | 101.4 | 99.6 | 99.2 | 98.0 | AVERAGE OF ABSOLUTE VALUES [%] |
| DIFFERENCE WITH TRUE REFLECTANCE [%] | -0.02 | -0.02 | -0.02 | -0.02 | -0.02 | -0.02 | -0.02 | -0.01 | 0.00 | 0.02 | 0.03 | 0.04 | 0.05 | 0.06 | 0.024 |

FIG. 24

| READING TIME | | PIXEL | | | | | | | | | | AVERAGE OF AVERAGE VALUES |
|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | |
| $T_1$ | | 85.9 | 100.1 | 115.6 | 101.6 | 109.6 | 88.7 | 116.3 | 110.8 | 108.8 | 105.4 | |
| $T_2$ | | 85.9 | 100.1 | 115.6 | 101.6 | 109.6 | 88.7 | 116.3 | 110.8 | 108.7 | 105.4 | |
| $T_3$ | | 85.9 | 100.1 | 115.6 | 101.6 | 109.6 | 88.7 | 116.3 | 110.8 | 108.7 | 105.3 | |
| $T_4$ | | 85.9 | 100.1 | 115.6 | 101.6 | 109.5 | 88.7 | 116.3 | 110.8 | 108.7 | 105.3 | |
| $T_5$ | | 85.9 | 100.1 | 115.6 | 101.6 | 109.5 | 88.7 | 116.3 | 110.8 | 108.7 | 105.3 | |
| | AVERAGE VALUE | 85.91 | 100.13 | 115.61 | 101.62 | 109.55 | 88.73 | 116.31 | 110.81 | 108.72 | 105.34 | 104.27 |
| | TEMPORAL CORRECTION COEFFICIENT OF EACH PIXEL | 2.328 | 1.997 | 1.730 | 1.968 | 1.826 | 2.254 | 1.720 | 1.805 | 1.840 | 1.899 | AVERAGE 1.937 |
| | RATIO WITH RESPECT TO IDEAL CORRECTION COEFFICIENT | 1.000 | 1.000 | 1.000 | 1.000 | 1.000 | 1.000 | 1.000 | 1.000 | 1.000 | 1.000 | ROOT-MEAN-SQUARE 1.0000 |
| | RATIO WITH PREVIOUS TEMPORAL CORRECTION COEFFICIENT | 1.0000 | 1.0000 | 1.0001 | 1.0001 | 1.0001 | 1.0001 | 1.0001 | 1.0000 | 1.0000 | 0.9998 | ROOT-MEAN-SQUARE OF RATIO WITH RESPECT TO PREVIOUS CORRECTION COEFFICIENT 1.00005 |

FIG.25

| READING TIME | PIXEL | | | | | | | | | | AVERAGE OF AVERAGE VALUES |
|---|---|---|---|---|---|---|---|---|---|---|---|
| | PX₁ | PX₂ | PX₃ | PX₄ | PX₅ | PX₆ | PX₇ | PX₈ | PX₉ | PX₁₀ | |
| T₁ | 200.0 | 200.0 | 200.0 | 200.0 | 200.0 | 200.0 | 200.0 | 200.0 | 200.0 | 200.0 | |
| T₂ | 200.0 | 200.0 | 200.0 | 200.0 | 200.0 | 200.0 | 200.0 | 200.0 | 200.0 | 200.0 | |
| T₃ | 200.0 | 200.0 | 200.0 | 200.0 | 200.0 | 200.0 | 200.0 | 200.0 | 200.0 | 200.0 | |
| T₄ | 200.0 | 200.0 | 200.0 | 200.0 | 200.0 | 200.0 | 200.0 | 200.0 | 200.0 | 200.0 | |
| T₅ | 200.0 | 200.0 | 200.0 | 200.0 | 200.0 | 200.0 | 200.0 | 200.0 | 200.0 | 200.0 | |
| AVERAGE VALUE | 200.00 | 200.00 | 200.00 | 200.00 | 200.00 | 200.00 | 200.00 | 200.00 | 200.00 | 200.00 | 200.00 |

FIG.26

| READING POSITION | LC$_1$ | LC$_2$ | LC$_3$ | LC$_4$ | LC$_5$ | LC$_6$ | LC$_7$ | LC$_8$ | LC$_9$ | LC$_{10}$ | LC$_{11}$ | LC$_{12}$ | LC$_{13}$ | LC$_{14}$ | AVERAGE OF AVERAGE VALUES |
|---|---|---|---|---|---|---|---|---|---|---|---|---|---|---|---|
| READING POSITION AVERAGE VALUE | 200.0 | 200.0 | 200.0 | 200.0 | 200.0 | 200.0 | 200.0 | 200.0 | 200.0 | 200.0 | 200.0 | 200.0 | 200.0 | 200.0 | 200.0 |
| RATIO OF REFLECTANCE | 1.0000 | 1.0000 | 1.0000 | 1.0000 | 1.0001 | 1.0001 | 1.0001 | 1.0000 | 1.0000 | 1.0000 | 1.0000 | 0.9999 | 0.9999 | 0.9998 | |
| REFLECTANCE ESTIMATION [%] | 101.4 | 100.6 | 99.0 | 99.5 | 102.2 | 97.6 | 99.8 | 102.0 | 100.7 | 99.2 | 101.3 | 99.6 | 99.2 | 97.9 | AVERAGE OF ABSOLUTE VALUES [%] |
| DIFFERENCE WITH TRUE REFLECTANCE [%] | -0.02 | -0.02 | -0.02 | -0.02 | -0.02 | -0.01 | -0.01 | 0.00 | 0.01 | 0.02 | 0.02 | 0.03 | 0.03 | 0.04 | 0.019 |

FIG.27

| READING TIME | | PIXEL | | | | | | | | | | | |
|---|---|---|---|---|---|---|---|---|---|---|---|---|---|
| | | $PX_1$ | $PX_2$ | $PX_3$ | $PX_4$ | $PX_5$ | $PX_6$ | $PX_7$ | $PX_8$ | $PX_9$ | $PX_{10}$ | | |
| | $T_1$ | 85.9 | 100.1 | 115.6 | 101.6 | 109.6 | 88.7 | 116.3 | 110.8 | 108.7 | 105.4 | | |
| | $T_2$ | 85.9 | 100.1 | 115.6 | 101.6 | 109.6 | 88.7 | 116.3 | 110.8 | 108.7 | 105.4 | | |
| | $T_3$ | 85.9 | 100.1 | 115.6 | 101.6 | 109.5 | 88.7 | 116.3 | 110.8 | 108.7 | 105.3 | | |
| | $T_4$ | 85.9 | 100.1 | 115.6 | 101.6 | 109.5 | 88.7 | 116.3 | 110.8 | 108.7 | 105.3 | | |
| | $T_5$ | 85.9 | 100.1 | 115.6 | 101.6 | 109.5 | 88.7 | 116.3 | 110.8 | 108.7 | 105.3 | | |
| | AVERAGE VALUE | 85.91 | 100.13 | 115.60 | 101.62 | 109.54 | 88.72 | 116.31 | 110.81 | 108.73 | 105.35 | AVERAGE OF AVERAGE VALUES | 104.27 |
| | TEMPORAL CORRECTION COEFFICIENT OF EACH PIXEL | 2.328 | 1.997 | 1.730 | 1.968 | 1.826 | 2.254 | 1.720 | 1.805 | 1.839 | 1.898 | AVERAGE | 1.937 |
| | RATIO WITH RESPECT TO IDEAL CORRECTION COEFFICIENT | 1.000 | 1.000 | 1.000 | 1.000 | 1.000 | 1.000 | 1.000 | 1.000 | 1.000 | 1.000 | ROOT-MEAN-SQUARE | 1.0000 |
| | RATIO WITH PREVIOUS TEMPORAL CORRECTION COEFFICIENT | 1.0000 | 1.0000 | 1.0001 | 1.0001 | 1.0001 | 1.0001 | 1.0000 | 1.0000 | 1.0000 | 0.9999 | ROOT-MEAN-SQUARE OF RATIO WITH RESPECT TO PREVIOUS CORRECTION COEFFICIENT | 1.00002 |

READING APPARATUS, CORRECTION VALUE CALCULATING METHOD AND INK JET RECORDING APPARATUS

CROSS-REFERENCE TO RELATED APPLICATIONS

The present application claims priority under 35 U.S.C. §119 to Japanese Patent Application No. 2015-052211, filed on Mar. 16, 2015. The above application is hereby expressly incorporated by reference, in its entirety, into the present application.

BACKGROUND OF THE INVENTION

Field of the Invention

The present invention relates to a reading apparatus, a correction value calculating method and an ink jet recording apparatus, and, more particularly, to a technique for calculating a shading correction value of an image pickup element from a result of a reference plate being read by the image pickup element.

Description of the Related Art

There is a case where in a scanner which reads an image on a printed matter, or the like, unevenness occurs in the read image due to ununiformity of an image pickup element, an optical system and illumination. In order to correct this ununiformity to reduce occurrence of unevenness, reading variation is corrected by reading a reference plate with uniform density in advance using the image pickup element, that is, so-called "shading correction" is performed.

Here, when there is a portion where density is ununiform due to contamination, or the like, on the reference plate, it is impossible to perform correct shading correction. Therefore, a method is used in which a plurality of reading values are acquired while the reference plate is moved with respect to the image pickup element and the optical system and an average value of the reading values is acquired.

Japanese Patent Application Laid-Open No. 2003-219124 discloses moving a reference plane of a reference plate in a direction different from a conveyance direction of a document sheet, and correcting reading sensitivity based on an average value or a maximum value of a plurality of pieces of image data respectively read from the moved reference plane. In Japanese Patent Application Laid-Open No. 2003-219124, if a detection position of abnormal data is moved in accordance with movement of the reference plane, it is determined that the abnormal data is caused by contamination, or the like, on the reference plane.

SUMMARY OF THE INVENTION

When the average value of the pieces of image data before and after the reference plane moves is used as in Japanese Patent Application Laid-Open No. 2003-219124, it is impossible to exclude influence of image data exhibiting an abnormal value unless sufficiently a lot of pieces of image data are acquired. Therefore, it is necessary to increase the size of the reference plate and make the reference plate move a long distance to acquire a lot of pieces of image data. However, such a configuration becomes an obstacle in terms of apparatus layout, and causes a problem of cost because a large reference plate which requires uniformity is expensive.

Further, if there is ununiformity in density of the reference plate due to a flaw, or the like, in parallel with a moving direction of the reference plate, an effect of using the average value is drastically reduced. Such ununiformity is likely to cause problems such as a problem that the reference plate is flawed by being in contact with another member.

Meanwhile, in order to use the maximum value among the pieces of image data before and after the reference plane moves, a desirable value (normal value) of the image data is required to be a large value (the large value indicates "bright"). While Japanese Patent Application Laid-Open No. 2003-219124 describes that the value of the image data is small in a portion of contamination of the reference plate, there is a case where when the reference plane has a flaw, a flaw portion reflects more light depending on a cross-section shape of the flaw and makes the image data larger than that in the case where there is no flaw. Therefore, in such a case, if the maximum value among the pieces of the image data is used, it is impossible to exclude an abnormal value.

Further, while Japanese Patent Application Laid-Open No. 2003-219124 describes that it is determined whether a piece of image data exhibiting an abnormal value included in reference data is caused by contamination of the reference plane or performance degradation of an element, a determining method is not specifically disclosed. For example, while Japanese Patent Application Laid-Open No. 2003-219124 describes influence by contamination on only a pixel of an abnormal value and pixels adjacent to the pixel of the abnormal value, the contamination may affect reading values of pixels in a broader range according to a size and distribution of density of the contamination and reading resolution, and a degree of the influence may be great in some pixels and small in other pixels. In such a state, it is difficult to determine which abnormal value of a piece of image data is due to contamination of the reference plate or due to performance degradation of the element. If a method of performing determination by comparing the image data with a threshold is used, a correction state becomes discontinuous at a border between a pixel equal to or greater than the threshold and a pixel less than the threshold, which may cause a defect such as a stripe in the corrected image.

As described above, the technique disclosed in Japanese Patent Application Laid-Open No. 2003-219124 includes a problem that it is impossible to acquire a shading correction value while appropriately excluding influence of contamination, or the like, on the reference plane.

Further, a method of reducing ununiformity by intentionally making the optical system out of focus upon reading of the reference plate so that ununiformity of density on the reference plate is optically obscured and is made not to clearly come out is also known. However, in this method, it is necessary to move focus largely to sufficiently obscuring ununiformity. As a result, there is a problem that positional relationship between a lens and the reference plate fluctuates, which changes an image forming state, and changes unevenness of a light amount of illumination to the image pickup element, and it is thus impossible to acquire a desirable shading correction value.

The present invention has been made in view of the above-described circumstances, and an object of the present invention is to provide a reading apparatus which can appropriately calculate a shading correction value even when there is ununiformity in density of a reference member which becomes a reference for shading correction, a correction value calculation method and an ink jet recording apparatus.

To achieve the above-described object, one aspect of a correction value calculating method of a reading apparatus which includes an image pickup element in which a plurality of pixels are arranged along a first direction and a shading correction device configured to correct variation of reading values of the plurality of pixels using a correction value for shading correction, the correction value calculating method includes a reading value acquiring step of acquiring reading values at respective pixels for respective reading positions at both ends of a reading range of a reference member and reading values at respective two or more pixels for respective reading positions in the reading range except the reading positions, and reading values for respective two or more reading positions at the respective pixels while relatively moving the image pickup element and the reference member which becomes a reference for shading correction in the first direction, and a correction value calculating step of calculating the correction value for shading correction based on the acquired reading values.

According to this aspect, because the image pickup element and the reference member which becomes a reference for shading correction are relatively moved in the first direction, the reading values at respective pixels for respective reading positions at both ends of the reading range of the reference member and the reading values at respective two or more pixels for respective reading positions in the reading range except the reading positions, and the reading values for respective two or more reading positions at the respective pixels are acquired, and the correction value for shading correction is calculated based on the acquired reading values, even if there is ununiformity in density of the reference member which becomes a reference for shading correction, it is possible to appropriately calculate a correction value for shading correction.

It is preferable that the correction value calculating method further includes a reading value variation acquiring step of acquiring variation of the reading values of the respective pixels by solving a system of equations in which the variation of the reading values of the respective pixels based on the acquired reading values and variation of density of the respective reading positions are set at unknowns, and in the correction value calculating step, the correction value for shading correction is calculated based on the variation of the reading values of the respective pixels. By this means, it is possible to appropriately calculate a correction value for shading correction.

It is preferable that in the reading value variation acquiring step, variation of the reading values of the respective pixels which averagely satisfies a system of equations in which noise included in the acquired reading values is set at an unknown is acquired using a Newton's method, a bisection method or a least-square method. By this means, it is possible to calculate a correction value for shading correction while taking into account noise included in the reading values.

It is preferable that in the correction value calculating step, a correction value for shading correction is calculated by performing repeat operation based on the acquired reading values. By this means, it is possible to appropriately calculate a correction value for shading correction.

It is preferable that the correction value calculating step includes a temporal correction value calculating step of calculating temporal correction values of the respective pixels based on an average value of the reading values for two or more reading positions at the respective pixels, a reflectance error calculating step of calculating reflectance errors of the respective positions based on an average value of results obtained by performing temporal correction on the reading values for respective positions of the reference member using the temporal correction values, a converting step of converting the reading values for the two or more reading positions at the respective pixels into new reading values using the reflectance errors, and an operation controlling step of causing repeat operation of processing in the temporal correction value calculating step, the reflectance error calculating step and the converting step to be performed, and setting a temporal correction value finally calculated through the repeat operation as the correction value for shading correction. By this means, it is possible to appropriately calculate a correction value for shading correction.

It is preferable that the correction value calculating method further includes a determining step of determining whether or not the temporal correction values converge, and in the operation controlling step, the repeat operation is caused to be performed until it is determined that the temporal correction values converge. By this means, it is possible to appropriately perform the repeat operation.

It is preferable that the correction value calculating method further includes a counting step of counting the number of repetitions of the repeat operation, and in the operation controlling step, the repeat operation is caused to be performed until the number of repetitions becomes equal to or greater than a threshold. By this means, it is possible to appropriately perform the repeat operation.

To achieve the above-described object, one aspect of a reading apparatus includes a reference member which becomes a reference for shading correction, an image pickup element in which a plurality of pixels are arranged along at least a first direction, a shading correction device configured to correct variation of reading values of the plurality of pixels using a correction value for shading correction, a moving device configured to relatively move the reference member and the image pickup element in the first direction, a reading value acquiring device configured to cause the image pickup element to read the reference member, and acquire reading values at respective pixels for respective reading positions at both ends in a reading range of the reference member and reading values at respective two or more pixels for respective reading positions in the reading range except the reading positions, and reading values for respective two or more reading positions at the respective pixels, and a correction value calculating device configured to calculate a correction value for shading correction based on the acquired reading values.

According to this aspect, because the image pickup element and the reference member which becomes a reference for shading correction are relatively moved in the first direction, the reading values at respective pixels for respective reading positions at both ends of the reading range of the reference member and the reading values at respective two or more pixels for respective reading positions in the reading range except the reading positions, and the reading values for respective two or more reading positions at the respective pixels are acquired, and the correction value for shading correction is calculated based on the acquired reading values, it is possible to appropriately calculate a correction value for shading correction even if there is ununiformity in density of the reference member which becomes a reference for shading correction.

It is preferable that in the image pickup element, a plurality of pixels are arranged in two dimensions along the first direction and a second direction different from the first direction, and the moving device relatively moves the reference member and the image pickup element along the first direction or the second direction. By this means, it is possible to appropriately calculate a correction value for shading correction even in the case of an image pickup element in which pixels are arranged in two dimensions.

It is preferable that the reading apparatus includes a light source configured to illuminate the reference member with light. By this means, it is possible to appropriately acquire reading values. Further, even when there is distribution in a light amount of the light source, it is possible to appropriately calculate a correction value for shading correction.

It is preferable that the reading apparatus includes a storage device configured to store a correction value for shading correction. It is possible to perform shading correction of the image pickup element by reading out the correction value for shading correction from the storage device.

To achieve the above-described object, one aspect of an ink jet recording apparatus includes an ink jet head and a reading apparatus configured to read an image recorded by the ink jet head, the reading apparatus including a reference member which becomes a reference for shading correction, an image pickup element in which a plurality of pixels are arranged along at least a first direction, a shading correction device which corrects variation of reading values of the plurality of pixels using a correction value for shading correction, a moving device which relatively moves the reference member and the image pickup element in the first direction, a reading value acquiring device which causes the image pickup element to read the reference member and acquires reading values at respective pixels for respective reading positions at both ends of a reading range of the reference member and reading values at respective two or more pixels for respective reading positions in the reading range except the reading positions, and reading values for respective two or more reading positions at the respective pixels, and a correction value calculating device which calculates a correction value for shading correction based on the acquired reading values.

According to this aspect, because the image pickup element and the reference member which becomes a reference for shading correction are relatively moved in the first direction, the reading values at respective pixels for respective reading positions at both ends of the reading range of the reference member and the reading values at respective two or more pixels for respective reading positions in the reading range except the reading positions, and the reading values for respective two or more reading positions at the respective pixels are acquired, and the correction value for shading correction is calculated based on the acquired reading values, it is possible to appropriately calculate a shading correction value even when there is ununiformity in density of the reference member which becomes a reference for shading correction.

To achieve the above-described object, one aspect of a non-transitory tangible computer-readable recording medium including instructions stored thereon, such that when the instructions are read and executed by a computer, the computer is configured to perform a correction value calculating method of a reading apparatus which includes an image pickup element in which a plurality of pixels are arranged along a first direction, and a shading correction device configured to correct variation of reading values of the plurality of pixels using a correction value for shading correction, the correction value calculating method including a reading value acquiring step of acquiring reading values at respective pixels for respective reading positions at both ends of a reading range of a reference member and reading values at respective two or more pixels for respective reading positions in the reading range except the reading positions, and reading values for respective two or more reading positions at the respective pixels while relatively moving the image pickup element and the reference member which becomes a reference for shading correction in the first direction, and a correction value calculating step of calculating the correction value for shading correction based on the acquired reading values.

According to this aspect, because the image pickup element and the reference member which becomes a reference for shading correction are relatively moved in the first direction, the reading values at respective pixels for respective reading positions at both ends of the reading range of the reference member and the reading values at respective two or more pixels for respective reading position in the reading range except the reading positions, and the reading values for respective two or more reading positions at the respective pixels are acquired, and the correction value for shading correction is calculated based on the acquired reading values, it is possible to appropriately calculate a shading correction value even if there is ununiformity in density of the reference member which becomes a reference for shading correction.

According to the present invention, it is possible to appropriately calculate a shading correction value even if there is ununiformity in density of the reference member which becomes a reference for shading correction.

BRIEF DESCRIPTION OF THE DRAWINGS

FIG. 5 is a diagram illustrating relationship of respective pixels $PX_i$ of the line sensor 20 at respective reading time and reading positions on the reference plane 40*a* of the white reference plate 40;

FIG. 6 is a diagram illustrating acquired data of the respective pixels $PX_i$ of the line sensor 20 at the respective reading time;

FIG. 7 is a diagram illustrating reflectance of respective reading positions $LC_j$ on the reference plane 40*a*;

FIGS. 8A and 8B are diagrams illustrating "target values", "overall sensitivity" and "ideal correction coefficients" of the respective pixels $PX_i$:

FIG. 10 is a diagram illustrating overall sensitivity of the respective pixels $PX_i$ while time elapses;

FIG. 1 is a diagram illustrating reflectance of the respective reading positions $LC_j$ read by the respective pixels $PX_i$ at respective reading time $T_k$;

FIG. 12 is a diagram illustrating reading values read at the respective positions $LC_j$ by the respective pixels $PX_i$ at the respective reading time $T_k$, average values of the reading values and temporal correction coefficients of the respective pixels $PX_i$:

FIG. 13 is a diagram illustrating a result obtained by correcting the reading values read at the respective positions $LC_j$ using a temporal shading correction value;

FIG. 14 is a diagram illustrating ratios of reflectance at the respective reading positions $LC_j$;

FIG. 15 is a diagram illustrating calculated new reading values of the respective pixels $PX_i$;

FIG. 16 is a diagram illustrating a result obtained by correcting the reading values read at the respective positions $LC_j$ using the temporal shading correction value:

FIG. 17 is a diagram illustrating ratios of reflectance at the respective reading positions $LC_j$;

FIG. 18 is a diagram illustrating calculated new reading values of the respective pixels $PX_i$;

FIG. 19 is a diagram illustrating a result obtained by correcting the reading values read at the respective positions $LC_j$ using the temporal shading correction value;

FIG. 20 is a diagram illustrating ratios of reflectance of the respective reading positions $LC_j$;

FIG. 21 is a diagram illustrating calculated new reading values of the respective pixels $PX_i$;

FIG. 22 is a diagram illustrating a result obtained by correcting the reading values read at the respective positions $LC_j$ using the temporal shading correction value;

FIG. 23 is a diagram illustrating ratios of reflectance at the respective reading positions $LC_j$;

FIG. 24 is a diagram illustrating calculated new reading values of the respective pixels $PX_i$;

FIG. 25 is a diagram illustrating a result obtained by correcting the reading values read at the respective positions $LC_j$ using the temporal shading correction value:

FIG. 26 is a diagram illustrating ratios of reflectance at the respective reading positions $LC_j$;

FIG. 27 is a diagram illustrating calculated new reading values of the respective pixels $PX_i$;

DETAILED DESCRIPTION OF THE PREFERRED EMBODIMENTS

Preferred embodiments of the present invention will be described in detail below according to accompanying drawings.

Configuration of Reading Apparatus

Figure 1:
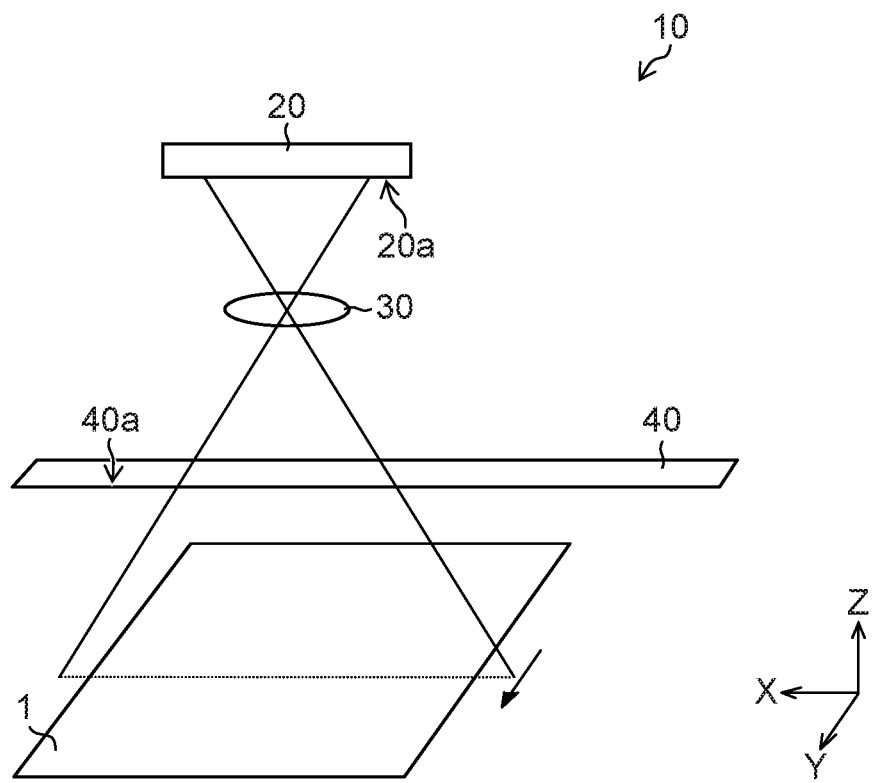
FIG. 1 is an overall configuration diagram of a reading apparatus 10.

A reading apparatus 10 is an apparatus which reads an image recorded on a recording face of conveyed paper 1 and converts the image into image data, and, as illustrated in FIG. 1, includes a line sensor 20, a lens 30, a white reference plate 40, or the like.

The paper 1 is a sheet type recording medium. The paper 1 is conveyed in a conveyance direction (Y direction in the figure) by a conveying unit 50 (not illustrated in FIG. 1, see FIG. 28) while the recording face on which the image is recorded faces upward in a vertical direction (Z direction in the figure).

Figure 2:
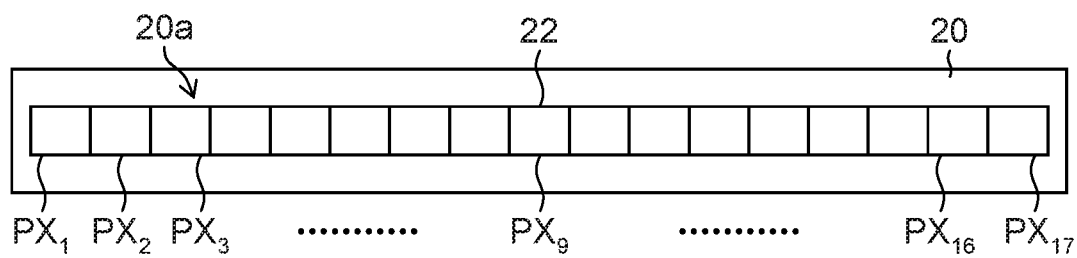
FIG. 2 is a diagram illustrating a reading face of a line sensor 20.

The line sensor 20 is provided above in a vertical direction on a conveyance path of the paper 1. The line sensor 20 is a monochromatic one-dimensional line sensor. As illustrated in FIG. 2, an image pickup element 22 is provided on a reading face 20a of the line sensor 20. The image pickup element 22 has 17 pixels $PX_i$ (i=1, 2, ..., 17), and the pixels $PX_i$ are arranged in line in an X direction in the figure (one example of a first direction). While the line sensor 20 is a monochromatic one-dimensional line sensor in the present embodiment, it is also possible to apply an aspect where the line sensor 20 is a one-dimensional line sensor in which two or more pixel arrays having different spectral sensitivity are integrally formed, such as a color line sensor including R, G. B color filters. Further, it is also possible to apply an aspect where a two-dimensional plane sensor is used in place of the one-dimensional line sensor. Still further, while the image pickup element 22 has 17 pixels $PX_i$, the present embodiment can be applied if the number of pixels is two or more.

Returning to description of FIG. 1, the lens 30 is provided between the conveyance path of the paper 1 and the line sensor 20. The lens 30 makes the image pickup element 22 form an image of a fixed range (image pickup range) on the recording face of the paper 1 while focusing on the recording face of the paper 1.

Further, the reading apparatus 10 includes illumination 60 (not illustrated in FIG. 1, see FIG. 28, one example ds of a light source) which illuminates at least the image pickup range on the paper 1 by the line sensor 20 with light. Here, the illumination 60 is fixed with respect to the line sensor 20.

The white reference plate 40 which is a reference member which becomes a reference for shading correction of the image pickup element 22, includes a reference plane 40a so that the image pickup element 22 acquires white reference data. While the reference plane 40a is a white face with uniform density (reflectance) in the present embodiment, it is also possible to apply an aspect where a gray reference plane 40a is used.

The reading apparatus 10 evacuates the white reference plate 40 to an evacuation position where the white reference plate 40 does not interfere with conveyance of the paper 1 by a driving unit 70 (not illustrated in FIG. 1, see FIG. 28) when the line sensor 20 reads the paper 1.

In the reading apparatus 10 configured in this manner, the conveying unit 50 conveys the paper 1 in a conveyance direction, and the illumination 60 illuminates the image pickup range on the recording face of the paper 1 by the line sensor 20. The lens 30 makes the image pickup element 22 form an image of the image pickup range on the recording face of the paper 1. The line sensor 20 reads the formed image on the recording face of the paper 1 using the image pickup element 22 and outputs read data.

Figure 3:
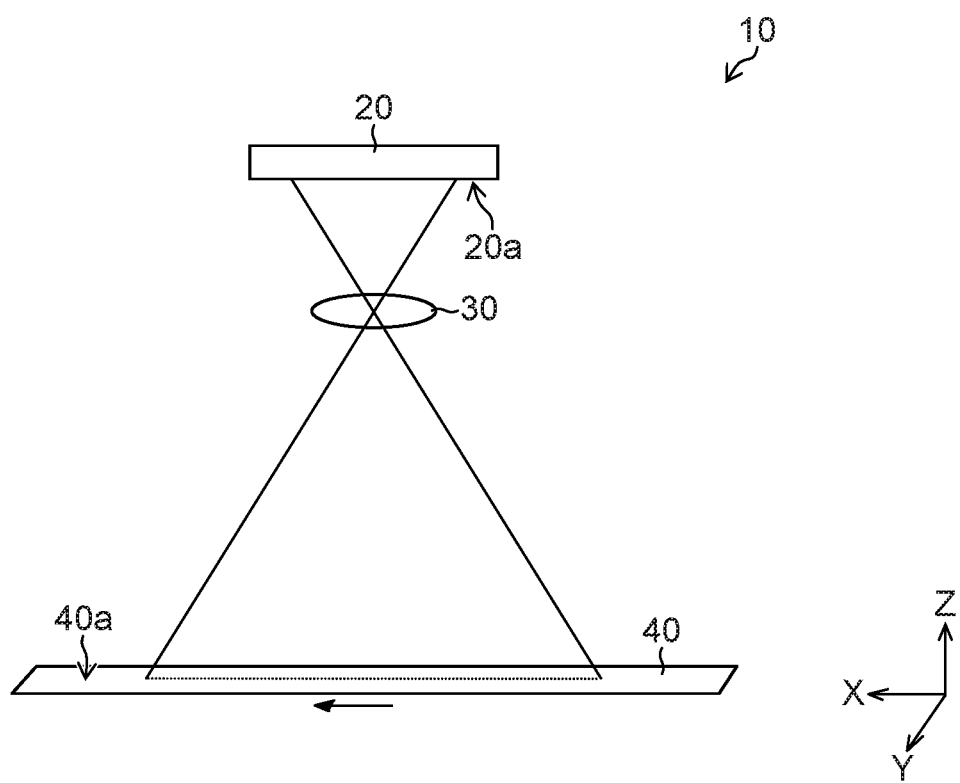
FIG. 3 is a diagram illustrating reading operation of a white reference plate 40.

Further, when the reference plane 40a of the white reference plate 40 is read to acquire a shading correction value of the image pickup element 22, as illustrated in FIG. 3, the reading apparatus 10 makes the driving unit 70 move the white reference plate 40 from the evacuation position to a position included in the image pickup range by the line sensor 20.

This state corresponds to a state where a bright image like a white image is read or a state where an intermediate gray image is read. Therefore, reading values on the reference plane 40a outputted from the respective pixels $PX_i$ of the image pickup element 22 become positive values which are not 0 (jet black state).

Figure 4:
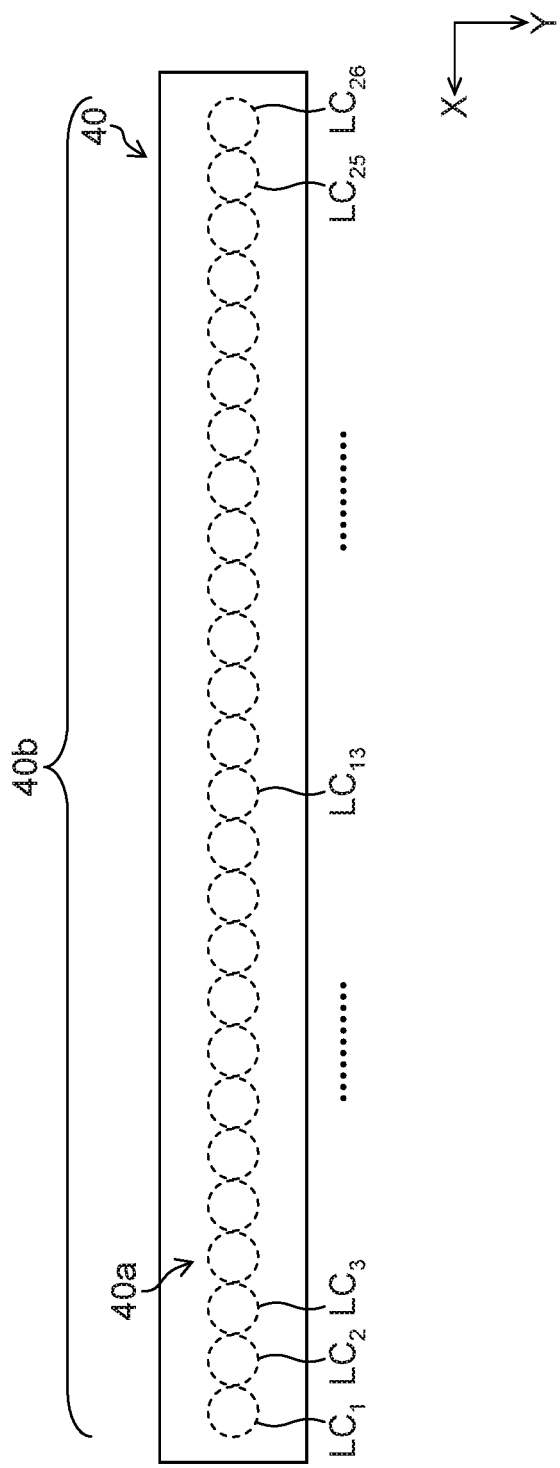
FIG. 4 is a diagram illustrating a reference plane 40*a* of the white reference plate 40.

As illustrated in FIG. 4, a reading range 40b including 26 reading positions $LC_j$ (j=1, 2, ..., 26) is provided on the reference plane 40a of the white reference plate 40. Spacing of center to center of the respective reading positions $LC_j$ is determined by spacing of center to center of the respective pixels $PX_i$ of the image pickup element 22 and a magnification by the lens 30. When the white reference plate 40 is located in the image pickup range by the line sensor 20, the respective pixels $PX_i$ of the image pickup element 22 correspond to any position of the respective reading positions $LC_j$. It should be noted that because the number of pixels of the image pickup element 22 is smaller than the number of reading positions $LC_j$, there are reading positions $LC_j$ that pixels $PX_i$ of specific numbers do not correspond to.

It should be noted that while FIG. 4 illustrates the reading positions $LC_j$ with round shapes, this is intended to make it easier to distinguish in the illustration, the accurate shapes of the reading positions are determined by the shapes of the pixels $PX_i$ of the image pickup element, aberration property of a lens to be used, flare, ghost property and a focusing state.

Further, the driving unit 70 (one example of the moving device) is configured so that the white reference plate 40 can move by one reading each in an arrangement direction (X direction in the figure) of the pixels of the image pickup element 22 in this state. It should be noted that it is only necessary that the driving unit 70 can relatively move the line sensor 20 and the white reference plate 40. Therefore, the driving unit 70 is not limited to one which moves the white reference plate 40, but may be one which moves the line sensor 20 or one which moves both the line sensor 20 and the white reference plate 40. Further, the movement is not limited to movement by one reading position each, but may be movement by a plurality of reading positions each.

Method of Reading White Reference Plate

When the reference plane 40a is read, the reading apparatus 10 makes the driving unit 70 move the white reference plate 40 by one reading position each in an X direction for each reading time. That is, the driving unit 70 moves the white reference plate 40 so that the reading positions $LC_j$ of the reference plane 40a are sequentially read by different pixels $PX_i$ of the image pickup element 22 for each reading time. The line sensor 20 acquires reading values of the reading positions $LC_j$ respectively facing the line sensor 20 in the respective pixels $PX_i$ by sequentially reading the moving white reference plate 40 for each reading time.

For example, as illustrated in FIG. 5, at reading time $T_1$, a pixel $PX_1$ reads a reading position $LC_1$, a pixel $PX_2$ reads a reading position $LC_2$, a pixel $PX_3$ reads a reading position $LC_3$, . . . , a pixel $PX_{17}$ reads a reading position $LC_{17}$. Further, at reading time $T_2$, the white reference plate 40 is relatively moved by one reading position in the X direction, the pixel $PX_1$ reads the reading position $LC_2$, the pixel $PX_2$ reads the reading position $LC_3$, the pixel $PX_3$ reads the reading position $LC_4$, . . . , the pixel $PX_{17}$ reads a reading position $LC_{18}$.

As a result of such reading operation, for example, the pixel $PX_i$ reads different reading positions $LC_1$, $LC_2$, $LC_3$ . . . , $LC_{10}$ on the reference plane 40a as the reading time elapses from $T_1$ to $T_{10}$. Meanwhile, for example, the reading position $LC_{17}$ is read by different pixels $PX_{17}$, $PX_{16}$, $PX_{15}$, . . . , $PX_8$ as the reading time elapses from $T_1$ to $T_{10}$.

That is, the reading apparatus 10 causes the reading positions $LC_1$, $LC_{26}$ at both ends of a reading range 40b on the reference plane 40a to be read by respective pixels $PX_1$, $PX_{17}$, causes the reading positions $LC_2$ to $LC_{25}$ of the reading range 40b except the reading positions $LC_1$, $LC_{26}$ to be read by respective two or more pixels $PX_i$, and causes the two or more reading positions $LC_j$ on the reference plane 40a to be read by respective pixels $PX_i$.

It should be noted that because the line sensor 20 reads a finite range, while there is a case where a reading position (for example, reading position $LC_1$) which is close to an end of the reference plane 40a of the white reference plate 40 in the X direction may deviate from an initial image pickup range by the line sensor 20 when the white reference plate 40 moves in the X direction, this causes no problem. Inversely, while there is a case where a reading position (for example, reading position $LC_{26}$) which is outside the initial image pickup range by the line sensor 20 before the white reference plate 40 moves in the X direction may become included in the image pickup range of the line sensor 20 by the movement of the white reference plate 40 in the X direction, this also causes no problem.

Here, reading values of the reading positions $LC_j$ read by the respective pixels $PX_i$ of the image pickup element 22 are set at D(i, j). That is, as illustrated in FIG. 6, a reading value of the reading position $LC_1$ read by the pixel $PX_1$ is D(1,1), a reading value of the reading position $LC_2$ read by the pixel $PX_2$ is D(2,2), . . . , a reading value of the reading position $LC_{25}$ read by the pixel $PX_{16}$ is D(16, 25), and a reading value of the reading position $LC_{26}$ read by the pixel $PX_{17}$ is D(17, 26).

If property of the respective pixels $PX_i$, density of the respective reading positions $LC_j$ on the reference plane 40a and a light amount of the illumination 60 are uniform, the reading values D(1, j), D(2,j), D(3,j), . . . at the same reading positions $LC_j$ on the reference plane 40a become the same value, and this value corresponds to density of the reading positions $LC_j$ of the white reference plate 40. In a similar manner, the reading values D(i,1), D(i,2), D(i,3), . . . by the same pixels $PX_i$ become the same value.

Therefore, when the reading values of the respective pixels $PX_i$ at the same reading positions $LC_j$ or the reading values of the same pixels $PX_i$ at the respective reading positions $LC_j$ are different, it indicates that these reading values include variation integrally including reading property of the pixels $PX_i$, density of the reading positions $LC_j$ and the light amount of the illumination.

It should be noted that because the illumination 60 is fixed with respect to the line sensor 20 here, when there is distribution of the light amount of the illumination 60, the distribution of the light amount of the illumination 60 is included in the variation of optical property of the pixels $PX_i$. Meanwhile, when the illumination 60 moves together with the white reference plate 40, the distribution of the light amount of the illumination 60 is included in the variation of the density of the reading positions $LC_j$.

Shading Correction Value Calculating Method

First Embodiment

A method for calculating a shading correction value (one example of a correction value for shading correction) to correct variation of the reading values of the respective pixels of the above-described image pickup element (one example of a correction value calculating method of the reading apparatus) will be described. In a first embodiment, the image pickup element 22 and the white reference plate 40 are relatively moved in the X direction using the above-described reading method of the white reference plate, and reading values at respective pixels $PX_1$, $PX_{17}$ for the reading positions $LC_1$, $LC_{26}$ at both ends of the reading range 40b and reading values at respective two or more pixels $PX_i$ for the reading positions $LC_2$ to $LC_{25}$ in the reading range 40b except the reading positions $LC_1$, $LC_{26}$, and reading values for respective two or more reading positions $LC_j$ at the respective pixels $PX_i$ are acquired (one example of a reading value acquiring step), a system of equations is written in which reading variation of the respective pixels $PX_i$ of the image pickup element 22 and density variation of the respective reading positions $LC_j$ on the reference plane 40a are set at unknowns, reading variation is obtained by solving this system of equations (one example of a reading value variation acquiring step), and a shading correction value is calculated (one example of a correction value calculating step).

Here, the reading variation of the respective pixels $PX_i$ is variation of the reading values of the respective pixels $PX_i$ for fixed density, and is indicated with a ratio of the reading values of the respective pixels $PX_i$ and a reference reading value here. Further, the density variation of the respective reading positions $LC_j$ is a ratio of density of the respective reading positions $LC_j$ and reference density.

Therefore, each equation in the system of equations can be expressed as:

(Reading value of pixel)=(reference reading value)×(density variation of reading position)×(reading variation of pixel).

For example, an equation for the reading value $D(1,1)$ illustrated in FIG. 6 can be expressed as:

$D(1,1)$=(reference reading value)×(density variation of reading position $LC_1$)×(reading variation of pixel $PX_1$).

The number of equations in the system of equations is a product (a×b) of the number of pixels which perform reading (a) and the number of times of reading performed at the respective pixels (the number of times of reading, b) while the line sensor 20 and the white reference plate 40 are relatively moved. In the example illustrated in FIG. 5, because the number of pixels is 17 of the pixel $PX_1$ to the pixel $PX_{17}$, and the number of times of reading performed at the 17 pixels while the line sensor 20 and the white reference plate 40 are relatively moved is 10 at reading time $T_1$ to reading time $T_{10}$, the number of equations in the system of equations is 17×10=170.

Meanwhile, concerning the number of unknowns, the reading variation of the respective pixels $PX_i$ is equal to the number of pixels (a), and the density variation of the respective reading positions $LC_j$ is equal to the number of reading positions (a+b−1) at which reading is performed. For example, in the example illustrated in FIG. 5, because 26 reading positions of the reading position $LC_1$ to the reading position $LC_{26}$ are read at 17 pixels of the pixel $PX_1$ to the pixel $PX_{17}$, the number of unknowns is 17+26=43.

In order to solve the system of equations, it is required that at least (the number of equations)≥(the number of unknowns). That is, the following is satisfied:

$(a \times b) \geq (a+(a+b-1))$  (equation 1)

Further, naturally, the number of pixels (a) and the number of times of reading (b) are positive integers greater than 0. A variation of equation 1 can be expressed as:

$(a-1) \times b \geq 2 \times a - 1$  (equation 2)

Here, when a is 1, a left side becomes 0, and a right side becomes 1, and equation 2 is not true. A further variation of equation 2 in the case where a is an integer equal to or greater than 2 can be expressed as:

$b \geq (2 \times a - 1) \div (a-1)$  (equation 3).

When a is 2, because the right side of equation 3 is 3, the number of times of reading is any number of 3 or greater. When a is 3, because the right side of equation 3 is 2.5, and the number of times of reading (b) is a positive integer greater than 0, b is also 3 or greater. Mathematically, when a is extremely great, the right side of equation 3 infinitesimally approximates 2. In an actual line sensor, a is 16,000 at most, and the right side of equation 3 in this case is approximately 2.00006. Therefore, it is required that at least b is 3 or greater to solve the system of equations.

If b is set at 2, while a solution is indeterminate and underspecified, because in the present embodiment, it is directed to calculating a shading correction value, by adding requirements that an average value of solutions is a predetermined value, a solution can be specified. Because the shading correction value is a ratio which corrects a reading value to a target value, the predetermined value may be set at, for example, 1. However, as indicated in the above-described example, in an actual configuration, because the number of equations is considerably larger than the number of unknowns, it is possible to solve the system of equations.

Further, because the reading values by the respective pixels $PX_i$ include noise, to be precise, this noise value becomes an unknown. However, when the noise is set at an unknown, because this value is equal to the number of equations in the system of equations, the number of unknowns becomes necessarily larger than the number of equations, which makes it impossible to solve the system of equations. In this case, it is only necessary to find a solution which averagely satisfies the system of equations by increasing the number of equations by securing a larger number of times of reading and using a Newton's method, a bisection method or a least-square method. While this system of equations is a system of multidimensional non-linear equations, a solving method through numerical calculation is typically known, and the bisection method and the Newton's method are disclosed in, for example, Kyoritsu Shuppan Co., Ltd., issued in November, 2008, Kazufumi Ozawa, "Numerical calculation algorithm learned using C", p. 26. "2.1 Bisection method", p. 55, "3.1 System of two-dimensional non-linear equations and Newton's method", or the like. The least-square method is disclosed in, for example, Kyoritsu Shuppan Co., Ltd., issued in September, 2005, Kenichi Kanatani, "Optimization mathematics which can be easily understood", p. 26. "Chapter 4 Least-square method", or the like.

By solving the system of equations in this manner, it is possible to obtain the reading variation of the respective pixels $PX_i$ and the density variation of the respective reading positions $LC_j$. A shading correction value for correcting the reading variation of the respective pixels $PX_i$ may be set at a value proportional to an inverse of the reading variation of the respective pixels $PX_i$.

By multiplying the reading values of the respective pixels $PX_i$ by the shading correction value obtained in this manner, it is possible to appropriately perform shading correction even when there is ununiformity in density on the reference plane 40a.

Second Embodiment

While with the shading correction value calculating method according to the first embodiment, when the number of pixels of the line sensor is thousands or more, it takes enormous time to perform operation. Therefore, a shading correction value calculating method (one example of the correction value calculating method of the reading apparatus) will be described which is simpler in numerical calculation than that in the first embodiment, but which can obtain a correction value (one example of a correction value for shading correction) with sufficient accuracy and which takes into account characteristics of reading at the line sensor, such as a state where a solution can be found that reading values of the same pixels of the line sensor become substantially the same.

In the second embodiment, a case will be described as an example where the number of pixels of the image pickup element 22 is 10, the number of times of reading of the respective pixels PX is 5, and there are 14 reading positions to be read on the reference plane 40a. This corresponds to a case where calculation is performed using reading values at reading time $T_1$ to reading time $T_5$ at the pixel $PX_1$ to the pixel $PX_{10}$ illustrated in FIG. 5.

Here, before each step of the shading correction value calculating method is described, reflectance of the reference plane 40a and overall sensitivity of the respective pixels $PX_i$ of the image pickup element 22 will be defined in advance. It should be noted that reflectance r of the reference plane 40a is a value having relationship of $r=10^{-d}$ when the density of the reference plane 40a is set at d. Further, the overall sensitivity s of the respective pixels $PX_i$ is a value having relationship of s=n/g when the reading values of the respective pixels $PX_i$ are set at n and an average value of all the reading values of the pixels $PX_i$ is set at g.

FIG. 7 illustrates values of reflectance [unit: %] of the respective reading positions $LC_j$ on the reference plane 40a defined in advance, and the values are dealt as "true reflectance" in the second embodiment. While values of the true reflectance in an actual apparatus are unknown values which are determined according to manufacturing variation, contamination, or the like, of the white reference plate 40, here, the values of the true reflectance are randomly determined within a range of variation determined in advance. The range of variation of the reflectance is 5.00 [% P-P] which is indicated as "reflectance unevenness set value [% P-P]" in FIG. 7. It should be noted that [% P-P] indicates a difference between maximum possible reflectance [%] and minimum possible reflectance [%] among the reflectance of the respective reading positions $LC_j$. (Actually, whether the reflectance becomes maximum or minimum is randomly determined, maximum and minimum reflectance values do not necessarily exist.)

It should be noted that numerical values in FIG. 7, FIG. 8A, FIG. 8B and FIG. 10 to FIG. 27 are obtained by rounding results calculated by a computer so as to be easily viewed. Because the computer performs calculation using the number of significant figures of approximately 15 figures, when calculation in the second embodiment is performed using values themselves which have a small number of significant figures obtained by rounding the results, there is a case where results slightly differ from values described in each table.

Further, because the reflectance illustrated in FIG. 7 is determined using average reflectance of 100 [%], the reflectance includes a value greater than 100 [%]. Further, here, because the number of reading positions $LC_j$ is small, the average reflectance is not 100 [%] due to influence of random variation. In the second embodiment, it is possible to appropriately obtain a correction coefficient including this gap of the average reflectance. It should be noted that it is not necessary that the average reflectance is 100 [%], and it is also possible to use actual arbitrary reflectance on the reference plane 40a other than 0 [%].

FIG. 8A illustrates a "target value" of the reading values of the respective pixels $PX_i$ of the image pickup element 22. This target value is a value of a result obtained by performing variation correction using a shading correction value on the reading values of the respective pixels $PX_i$ for the reference plane 40a. That is, after the variation correction, the reading values on the reference plane 40a become the target value in all the pixels $PX_i$. This target value can be determined to be an arbitrary value. For example, when analog output signals of the respective pixels $PX_i$ are A/D (analog/digital) converted into 8-bit digital signals, if the average value of the reading values is tried to be set at 200 sufficiently smaller than the reading values so that the reading values of the respective pixels $PX_i$ do not exceed 8 bits (255), the target value may be determined to be 200.

FIG. 8B illustrates values of "overall sensitivity" and "ideal correction coefficients" of the respective pixels $PX_i$ defined in advance.

The "overall sensitivity" of the respective pixels $PX_i$ is unknown values determined according to sensitivity variation of the respective pixels $PX_i$ and variation of distribution of the light amount of the illumination in an actual apparatus, and can be expressed with a product of sensitivity of the respective pixels $PX_i$ and distribution of the light amount of the illumination. Here, the overall sensitivity is randomly determined within a range of variation determined in advance. The range of variation of the overall sensitivity is 0.4 [P-P] which is indicated as "sensitivity variation set value [P-P]" in FIG. 8B. It should be noted that [P-P] indicates a difference between maximum possible overall sensitivity and minimum possible overall sensitivity among the overall sensitivity of the respective pixels $PX_i$ (because whether the overall sensitivity actually becomes maximum or minimum is randomly determined, the maximum and minimum overall sensitivity values do not necessarily exist). Further, while an average of the overall sensitivity is determined to be 1, in the example illustrated in FIG. 8B, because the number of pixels $PX_i$ is small, the overall sensitivity is affected by random variation, and the average is not 1.

Meanwhile, the "ideal correction coefficient" is a value proportional to an inverse of the overall sensitivity, and a relative value among the respective pixels $PX_i$. The inverse of the overall sensitivity of the respective pixels $PX_i$ is affected when the reflectance on the reference plane 40a deviates from a reference value (here, 100 [%]). Therefore, the ideal correction coefficient is corrected by dividing the inverse of the overall sensitivity of the respective pixels $PX_i$ by an average value of the reflectance on the reference plane 40a. Further, in order to make the ideal correction coefficient proportional to the target value, the inverse of the overall sensitivity of the respective pixels $PX_i$ in which the reflectance on the reference plane 40a is corrected is multiplied by the target value. That is, it can be expressed as (ideal correction coefficient)=(inverse of overall sensitivity of each pixel $PX_i$)÷(average value of reflectance)×(target value). It is only necessary that the correction coefficient (shading correction value) of the respective pixels $PX_i$ obtained in the second embodiment becomes a value close to this ideal correction coefficient.

Figure 9:
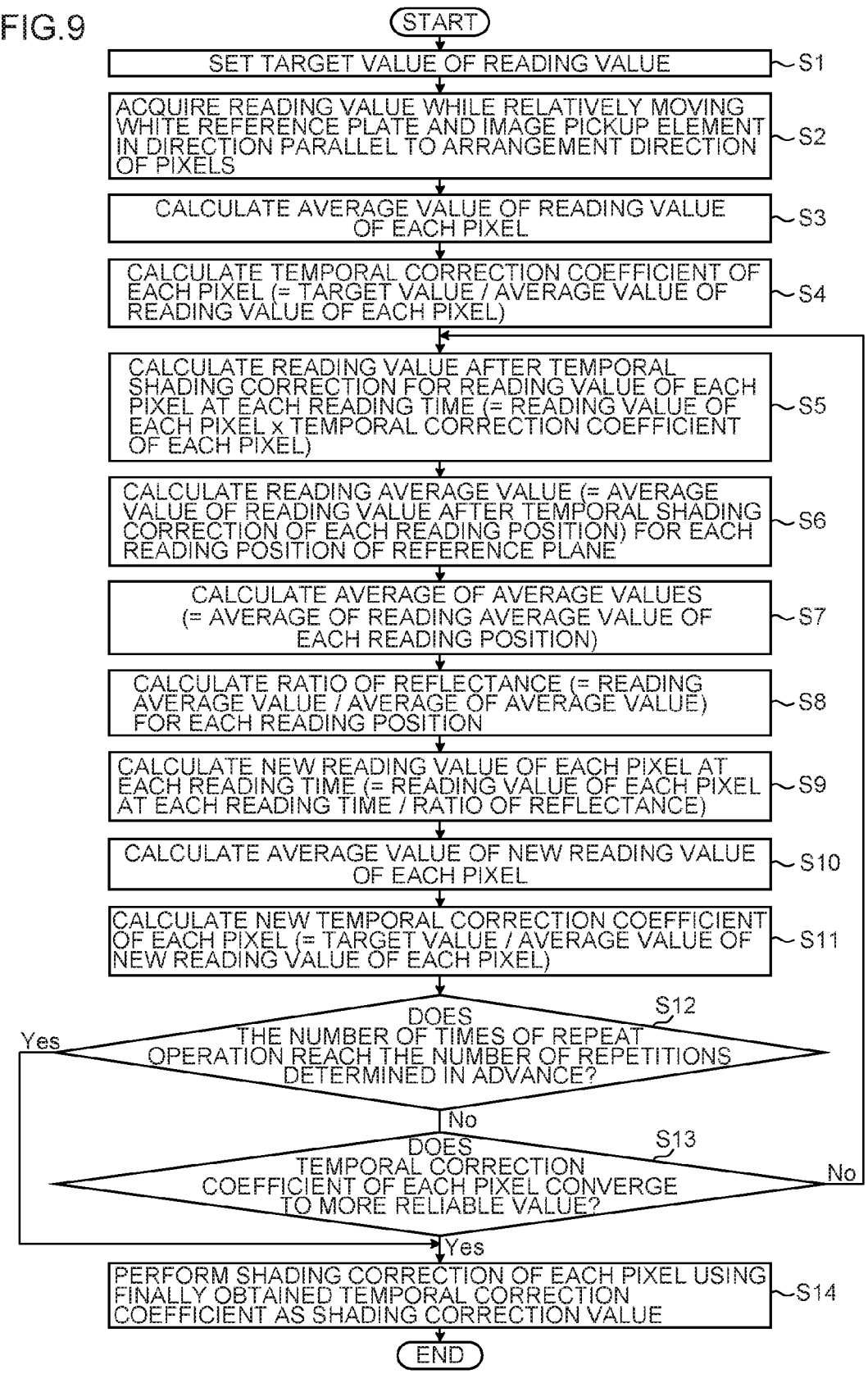
FIG. 9 is a flowchart illustrating a shading correction value calculating method according to a second embodiment.

Each step of the shading correction value calculating method according to the second embodiment will be described next using the flowchart in FIG. 9.

First, a target value of the reading values of the respective pixels $PX_i$ for the reference plane 40a of the image pickup element 22 is set (step S1). The target value may be a value determined in advance or a value inputted by a user through an input device which is not illustrated. Here, the target value is set at 200.

Then, reading of the reference plane 40a is performed at the respective pixels $PX_i$ while the line sensor 20 and the white reference plate 40 are relatively moved by one reading position each in a pixel arrangement direction of the image pickup element 22. Here, the respective reading positions $LC_j$ indicated in FIG. 5 are read by the pixel $PX_1$ to the pixel $PX_{10}$ at the reading time $T_1$ to the reading time $T_5$ (step S2, one example of a reading value acquiring step).

FIG. 10 illustrates overall sensitivity of the respective pixels $PX_i$ at the respective reading time $T_k$. As illustrated in FIG. 10, when there is no noise upon reading, the overall sensitivity of the respective pixels $PX_i$ becomes fixed at a value defined in FIG. 8B regardless of the reading time $T_k$. Here, while an example is illustrated where noise upon reading is not included, in the second embodiment, even if noise is included upon reading, it is possible to obtain a correction coefficient close to the ideal correction coefficient.

FIG. 11 illustrates reflectance of the respective reading positions $LC_j$ read by the respective pixels $PX_i$ at the respective reading times $T_k$. Relationship between the respective pixels $PX_i$ and the respective reading positions $LC_j$ at the respective reading time $T_k$ is the same as the relationship illustrated in FIG. 5. For example, the pixel $PX_i$ reads the reading position $LC_1$ at the reading time $T_1$, and reflectance of the reading position $LC_1$ is 101.34 as illustrated in FIG. 7. Therefore, reflectance read by the pixel $PX_1$ at the reading time $T_1$ is 101.3 if the reflectance is expressed to the first decimal place, as illustrated in FIG. 11. Other values can be obtained in a similar manner from FIG. 5 and FIG. 7.

FIG. 12 illustrates reading values of the respective positions $LC_j$ read by the respective pixels $PX_i$ at the respective reading time $T_k$. While actual reading values can be obtained as values of digital signals which are obtained by A/D converting analog output signals of the respective pixels $PX_i$ of the image pickup element 22, here, from the overall sensitivity of the respective pixels $PX_i$ illustrated in FIG. 10 and the reflectance of the respective reading positions $LC_j$ illustrated in FIG. 11, reading values read when the overall sensitivity of the pixels $PX_i$ is 1 and the reflectance of the reading positions $LC_j$ is 100 [%] is obtained as 100.

Next, an "average value" for each pixel obtained by averaging reading values of the same pixels $PX_i$ is calculated based on the reading values of the respective pixels $PX_i$ illustrated in FIG. 12, and further, an "average of average values" obtained by averaging average values of the all pixels $PX_i$ is calculated (step S3). The "average value" and the "average of average values" calculated in this manner are illustrated in FIG. 12.

Subsequently, temporal correction coefficients of the respective pixels $PX_i$ are calculated such that the average value of the reading values of the respective pixels $PX_i$ becomes the target value illustrated in FIG. 8A (step S4, one example of a temporal correction value calculating step). That is, the temporal correction coefficients of the respective pixels $PX_i$ can be expressed as (temporal correction coefficient of each pixel=(target value)÷(average value of reading values of each pixel). Values of the temporal correction coefficients of the respective pixels $PX_i$ are illustrated in FIG. 12.

While the temporal correction coefficients of the respective pixels $PX_i$ have some errors compared to the ideal correction coefficient illustrated in FIG. 8B, the temporal correction coefficients become a "temporal shading correction value" as a basically correct value. If there is no unevenness in the reflectance of the respective reading positions $LC_j$ and the reflectance is uniform, the temporal correction coefficients of the respective pixels $PX_i$ match the ideal correction coefficient. However, when there is variation in the reflectance of the respective reading positions $LC_j$ due to manufacturing variation of the white reference plate 40, or the like, there occurs a gap between the temporal correction coefficients and the ideal correction coefficient.

In repeat operation processing in the following step S5 to step S11 (one example of a correction value calculating step), this gap is made smaller. Here, a degree of the gap is evaluated using an evaluation value which is quantitatively expressed. As the evaluation value, a root-mean-square of the ratio of the temporal correction coefficients of the respective pixels $PX_i$ and the ideal correction coefficient is used. When this evaluation value is smaller, the gap between the temporal correction coefficients of the respective pixels $PX_i$ and the ideal correction coefficient is averagely smaller.

It should be noted that this evaluation value indicates that the temporal correction coefficients of the respective pixels $PX_i$ approximates the ideal correction coefficient through the repeat operation of the second embodiment. In an actual apparatus, the ideal correction coefficient is not obvious. Therefore, the process of improvement of the temporal correction coefficients of the respective pixels $PX_i$ is determined by a "ratio with respect to the previous temporal correction coefficients" which will be described later.

Subsequently, the reading values of the respective pixels $PX_i$ illustrated in FIG. 12 are subjected to variation correction using the temporal correction coefficients of the respective pixels $PX_i$ which are temporal shading correction values, and reading values after the temporal shading correction are acquired (step S5). That is, the reading values after the temporal shading correction can be expressed as (reading value after temporal shading correction)=(reading value)× (temporal shading correction value). The reading values after the temporal shading correction are illustrated in FIG. 13. Because the temporal correction coefficients of the respective pixels $PX_i$ are determined so that an average of the reading values of the respective pixels $PX_i$ becomes a target value, an average value of the reading values of the respective pixels illustrated in FIG. 13 after the temporal shading correction is equal to the target value.

Subsequently, a correction amount of reflectance of the respective reading positions $LC_j$ (ratio of reflectance) is estimated using the reading values of the respective pixels illustrated in FIG. 13 after the temporal shading correction.

To estimate the correction amount, first, an average value of the reading values obtained by reading the same reading positions $LC_j$ is acquired from the reading values of the respective pixels $PX_i$ illustrated in FIG. 13 after the shading correction (step S6). This value is set as a "reading position average value" (one example of the average value of the result of the reading values of two or more pixels for the respective positions being subjected to temporal correction) at the respective reading positions $LC_j$.

For example, the reading position $LC_5$ is read by the pixel $PX_5$ at the reading time $T_1$, the pixel $PX_4$ at the reading time $T_2$, the pixel $PX_3$ at the reading time $T_3$, the pixel $PX_2$ at the reading time $T_4$, and the pixel $PX_1$ at the reading time $T_1$. Therefore, the reading position average value of the reading position $LC_5$ is an average value (204.1) of five values of 203.4, 203.9, 205.1, 204.8 and 203.2 which are reading values after the shading correction illustrated in FIG. 13. The reading position average values are calculated in a similar manner for other reading positions $LC_j$ (j=1 to 4, 6 to 14). It should be noted that because the reading position $LC_1$ and the reading position $LC_{14}$ are read only once, the values read only once are set as the reading position average values. The reading position average values at the respective reading positions $LC_j$ obtained in this manner are illustrated in FIG. 14.

Next, an "average of average values" obtained by averaging the reading position average values of the respective reading positions $LC_j$ is obtained (step S7), and the reading position average values of the respective reading positions $LC_j$ are divided by the average of the average values to calculate the "ratio of reflectance" of the respective reading positions $LC_j$ (step S8, a reflectance error calculating step). The average of the average values and the ratio of reflectance of the respective reading positions $LC_j$ are illustrated in FIG. 14.

While this ratio of reflectance of the respective reading positions $LC_j$ has some error with respect to true reflectance of the respective reading positions $LC_j$, the ratio is set as a "temporal reflectance error" regarded as a basically correct value. When a value of the ratio of reflectance is less than 1, the reading position $LC_j$ corresponding to the value is a portion where the reflectance is relatively low on the reference plane 40a.

In order to indicate validity of the algorithm according to the second embodiment, FIG. 14 illustrates "reflectance estimation" [unit: %], "difference with true reflectance" [unit: %], and "average of absolute values" [unit: %] at the respective reading positions $LC_j$.

The reflectance estimation is reflectance of the respective reading positions $LC_j$ obtained by integrating the ratio of reflectance. The reflectance estimation of the first repeat operation is a ratio of the reflectance itself, and the reflectance estimation of the second and thereafter repeat operation is a value obtained by multiplying the reflectance estimation calculated in the previous operation by a newly calculated ratio of reflectance. However, it is assumed that the average reflectance is 100 [%] in this calculation.

The difference with the true reflectance is a difference between the reflectance estimation at the respective reading positions $LC_j$ and the true reflectance. Further, the average of the absolute values is an average value of the absolute values of the "differences with the true reflectance" at the respective reading positions $LC_j$. It should be noted that correction is performed by uniformly multiplying the same coefficient so that the average of reflectance illustrated in FIG. 7 becomes 100 [%]. It should be noted that it is not necessary to calculate the "reflectance estimation" [unit: %], the "difference with true reflectance" [unit: %] and the "average of absolute values" when the second embodiment is implemented.

Next, new reading values of the respective pixels $PX_i$ are calculated by excluding influence of the reflectance errors of the respective reading positions $LC_j$ by dividing the reading values of the respective pixels $PX_i$ illustrated in FIG. 12 by the ratios of reflectance corresponding to the respective reading positions $LC_j$, illustrated in FIG. 14 (step S9, one example of a converting step). That is, the new reading values can be expressed as (new reading value of each pixel)=(reading value of each pixel) (ratio of reflectance of corresponding reading position). The calculated new reading values of the respective pixels $PX_i$ are illustrated in FIG. 15. In this manner, by using the temporal reflectance errors, it is possible to obtain the reading values of the respective pixels $PX_i$ in the case where the reflectance is fixed, without including reflectance errors of the respective reading positions $LC_j$.

Here, if the temporal reflectance errors match actual reflectance errors, the new reading values at the respective reading time $T_k$ of the same pixel $PX_i$ are equal. In FIG. 15, although new reading values at the respective reading time $T_k$ for any pixel $PX_i$ are not equal, it can be recognized that differences of values at the respective reading time $T_k$ are smaller than reading values at the respective reading time $T_k$ illustrated in FIG. 12.

Next, average values of the new reading values for the same pixel $PX_i$ are acquired, and, further, an average of the average values (average of new average values) of the new reading values of the respective pixels $PX_i$ is acquired (step S10). The average values of the new reading values of the respective pixels $PX_i$ and the average of the new average values are illustrated in FIG. 15.

Further, new temporal correction coefficients of the respective pixels $PX_i$ are obtained so that the average values of the new reading values of the respective pixels $PX_i$ become a target value (step S11). That is, it can be expressed as (new temporal correction coefficient of each pixel)= (target value)÷(average value of reading values of each pixel). The temporal correction coefficients of the respective pixels $PX_i$ become a shading correction value subjected to the repeat operation of "operation for correcting correction coefficients" according to the second embodiment.

In this example, even if there is an error of approximately 5.00 [% P-P] in variation of reflectance of the reference plane 40a, the error becomes only 0.9997 in a ratio with respect to the "ideal correction coefficient" through the first correction.

Next, whether or not the number of times of the repeat operation reaches the number of repetitions determined in advance is determined (step S12, one example of a counting step). When the number of times of the repeat operation reaches the number of repetitions determined in advance, processing of calculating a shading correction value is finished, and the process shifts to step S14. On the other hand, when the number of times of the repeat operation does not reach the number of repetitions determined in advance, the process shifts to step S13.

Next, it is determined whether or not the temporal correction coefficients of the respective pixels $PX_i$ converge to more reliable values. Here, a root-mean-square of the ratio between the previous temporal correction coefficients of the respective pixels $PX_i$ and the temporal correction coefficients of the respective pixels $PX_i$ obtained this time is obtained as an evaluation value, and it is determined whether or not the evaluation value is less than a threshold determined in advance (step S13, one example of a determining step).

When the evaluation value is less than the threshold, the shading correction value calculating processing is finished, and the process shifts to step S14. On the other hand, when the evaluation value is equal to or greater than the threshold, the process returns to step S5, and repeat operation processing (step S5 to step S1) is performed until the number of times of operation reaches the number of repetitions determined in advance or until the evaluation value becomes less than the threshold, that is, until temporal correction coefficients with desired accuracy can be obtained (one example of an operation controlling step).

Finally, shading correction of the respective pixels $PX_i$ is performed using the finally obtained temporal correction coefficients as the shading correction value (step S14). It should be noted that performing the repeat operation in step S5 to step S1, determining whether or not there is repeat operation in step S12 and step S13, and setting the temporal correction values finally calculated through the repeat operation in step S14 as the shading correction value, are referred to as the operation controlling step.

FIG. 16 to FIG. 27 illustrate examples of the second to the fifth repeat operation. It should be noted that FIG. 13. FIG. 14 and FIG. 15 in the first operation correspond to FIG. 16, FIG. 17 and FIG. 18 in the second operation, FIG. 19, FIG. 20 and FIG. 21 in the third operation, FIG. 22, FIG. 23 and FIG. 24 in the fourth operation, and FIG. 25, FIG. 26 and FIG. 27 in the fifth operation.

When the "average values of absolute values" in FIG. 14, FIG. 17, FIG. 20, FIG. 23 and FIG. 26 are compared, the values become smaller as the operation is repeated.

As illustrated in FIG. 15, FIG. 18 and FIG. 21, in this example, a root-mean-square of the ratio with the previous correction coefficients is 1.00010 in the third repeat operation, which is a difference of $1/10000$ or less. Further, when this value is compared with a root-mean-square of the "ratio of the ideal correction coefficients", it can be recognized that there is correlation.

Practically, when a change amount of the root-mean-square of the ratio with respect to the previous correction coefficients is less than a ratio between a minimum unit of resolution of the reading values and a maximum value of the reading values, there is no difference even if accuracy of the correction coefficients is improved.

In this manner, according to the shading correction value calculating method according to the second embodiment, even when there is variation in reflectance of the reference plane 40a of the white reference plate 40, it is possible to obtain correction coefficients (shading correction values) close to the ideal correction coefficient. Further, by multiplying the reading values of the respective pixels $PX_i$ by the shading correction value obtained in this manner, it is possible to appropriately perform shading correction even if there is ununiformity in density (reflectance) on the reference plane 40a.

It should be noted that as determination as to whether or not the correction coefficients of the respective pixels $PX_i$ converge to more reliable values, performed in step S12, it is possible to employ any of an aspect where a ratio between the previous correction coefficients of the respective pixels $PX_i$ and the correction coefficients of the respective pixels $PX_i$ obtained this time is obtained, and a sum of the ratios in the respective pixels $PX_i$ is used, and an aspect where a difference between the previous correction coefficients of the respective pixels $PX_i$ and the correction coefficients of the respective pixels $PX_i$ obtained this time is obtained, a root-mean-square of the difference in the respective pixels $PX_i$ is used, and an aspect where an absolute value of the difference between the previous correction coefficients of the respective pixels $PX_i$ and the correction coefficients of the respective pixels $PX_i$ obtained this time is obtained, and a sum of the absolute values of the difference in the respective pixels $PX_i$ is used.

Further, it is also possible to determine in advance the number of times that correction coefficients can be obtained with sufficient accuracy, and finish the processing after the determined number of times of repeat operation processing is performed. When the number of times at a maximum required for convergence is examined while the overall sensitivity of the pixels $PX_i$ and the reflectance of the reading positions $LC_j$ are changed using random numbers, it is found that six times of repeat operation at a maximum is required for convergence.

It should be noted that, theoretically, when there is sinusoidal ununiformity in the reflectance on the reference plane 40a, or when there is change of reflectance such that the whole reference plane 40a is largely inclined, there is a case where it is impossible to obtain appropriate correction coefficients with the shading correction value calculating method according to the second embodiment. However, because the reference plane 40a is formed so as to have substantially uniform reflectance, and the second embodiment is intended to appropriately perform shading correction for partial defects on the reference plane 40a, it is not necessary to question these cases practically.

While in the second embodiment, a monochromatic one-dimensional line sensor is used as a device for reading the reference plane 40a, the same also applies to a two-dimensional sensor in which pixels are arranged in two dimensions, or a color sensor in which pixels having different spectral sensitivity are arranged to read a plurality of colors.

When a two-dimensional sensor is used, when it is assumed that a plurality of pixels of an image pickup element are arranged in two dimensions along a first direction and a second direction different from the first direction, the driving unit 70 only has to relatively move the two-dimensional line sensor and the white reference plate 40 along the first direction or the second direction.

The shading correction value calculating method described above can be configured as a program for causing a computer to execute each step, and a non-transitory recording medium (for example, CD-ROM (Compact Disk-Read Only Memory)) in which the program is stored can be configured.

Electrical Configuration of Reading Apparatus

Figure 28:
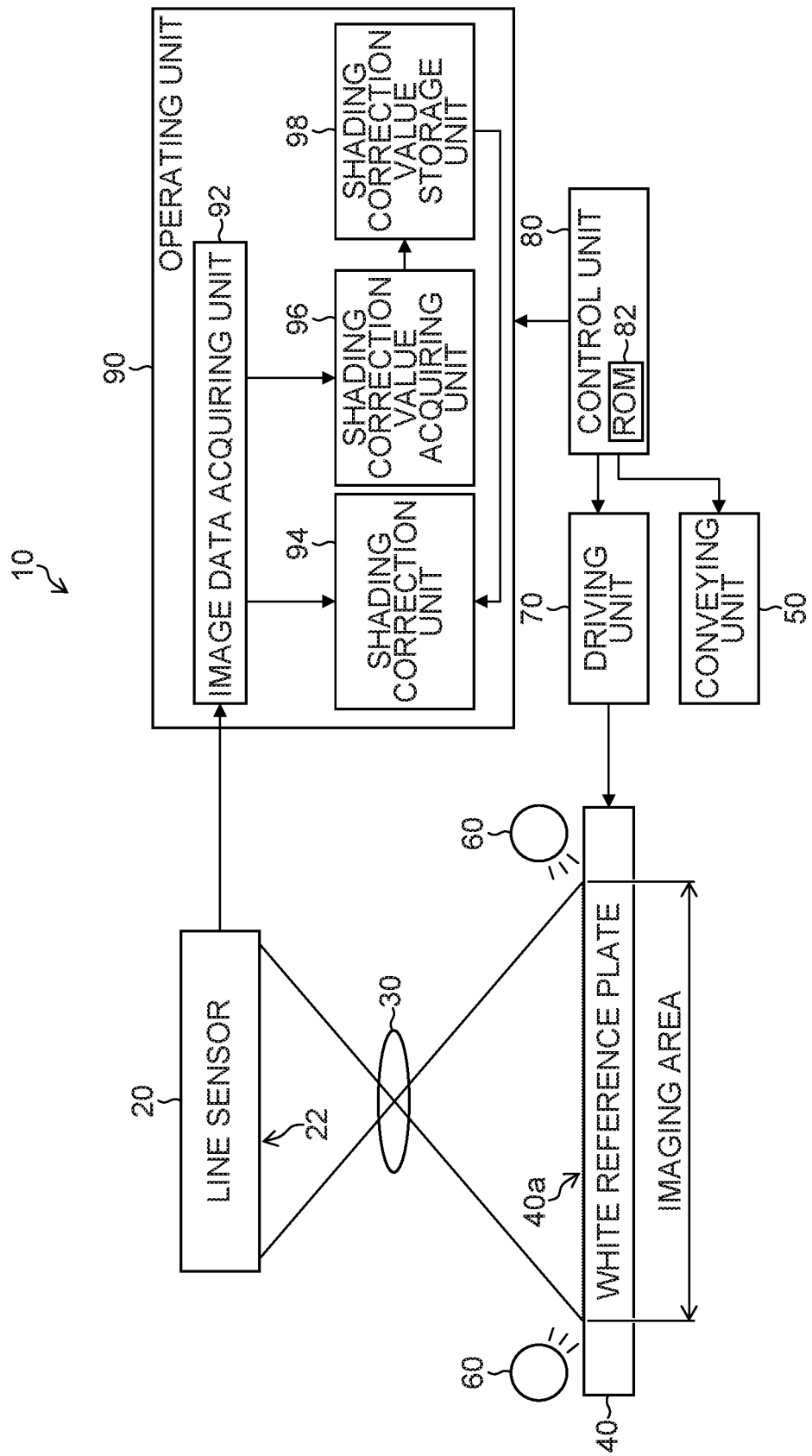
FIG. 28 is a block diagram illustrating an electrical configuration of the reading apparatus 10.

As illustrated in FIG. 28, the reading apparatus 10 includes a control unit 80 and an operating unit 90 in addition to the line sensor 20, the lens 30, the white reference plate 40, the conveying unit 50, the illumination 60 and the driving unit 70 described above.

The control unit 80 (one example of a control device, one example of a computer) is configured with a CPU (Central Processing Unit), and controls the conveying unit 50, the driving unit 70 and the operating unit 90 by executing various kinds of programs (one example of a program for causing the computer to execute the correction value calculating method of the reading apparatus) and information read from a built-in ROM (Read Only Memory) 82, so as to cause the image pickup element 22 of the line sensor 20 to read a recording face of the paper 1 (see FIG. 1) conveyed by the conveying unit 50 to detect an image defect on the recording face, and calculate shading correction values of the respective pixels $PX_i$ by reading the reference plane 40a of the white reference plate 40.

The operating unit 90 includes an image data acquiring unit 92, a shading correction unit 94, a shading correction value acquiring unit 96 and a shading correction value storage unit 98.

The image data acquiring unit 92 (one example of a reading value acquiring device) acquires an analog output signal of each pixel from the image pickup element 22 of the line sensor 20, and A/D converts the analog output signal into a 8-bit digital signal to acquire image data.

In the shading correction value storage unit 98 (one example of a storage device), the shading correction value of each pixel is stored. The shading correction unit 94 (one example of a shading correction device) reads out the shading correction value and performs shading correction on the image data inputted from the image data acquiring unit 92.

The shading correction value acquiring unit 96 (one example of a correction value calculating device) acquires the shading correction value of each pixel by performing operation of each step in the above-described shading correction value calculating method. For example, in the first embodiment, the shading correction value acquiring unit 96 is configured to include a reading variation acquiring device. Further, the shading correction value acquiring unit 96 causes the acquired shading correction value to be stored in the shading correction value storage unit 98.

Configuration of Shading Correction Value Acquiring Unit

Next, the shading correction value acquiring unit 96 will be described. Here, a configuration in the case where the shading correction value calculating method according to the second embodiment is implemented will be described.

Figure 29:
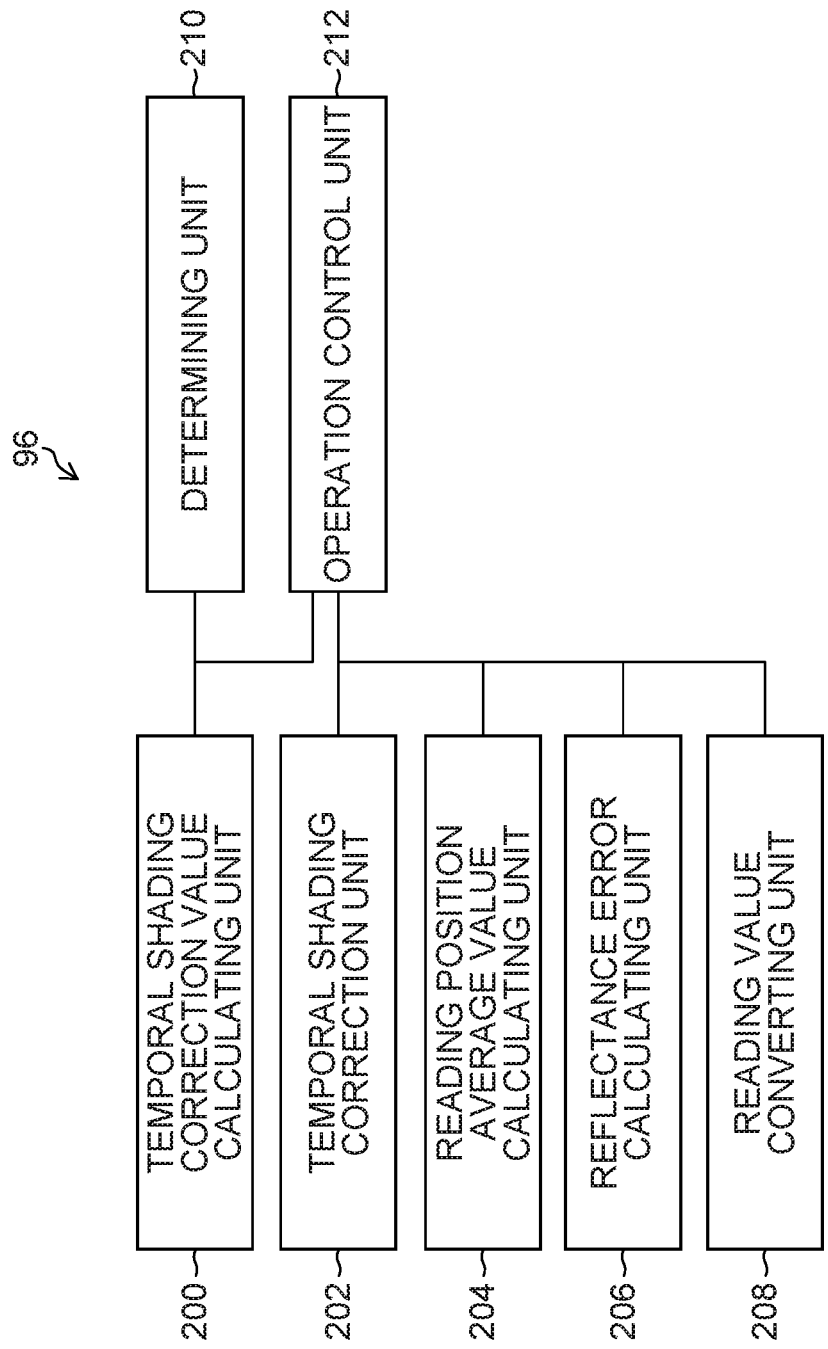
FIG. 29 is a block diagram of a shading correction value acquiring unit.

As illustrated in FIG. 29, the shading correction value acquiring unit 96 includes a temporal shading correction value calculating unit 200, a temporal shading correction unit 202, a reading position average value calculating unit 204, a reflectance error calculating unit 206, a reading value converting unit 208, a determining unit 210 and an operation control unit 212.

The temporal shading correction value calculating unit 200 acquires the reading values of the respective pixels $PX_i$ acquired from the image data acquiring unit 92 by reading the reference plane 40a while relatively moving the line sensor 20 and the white reference plate 40 by one reading position each in an arrangement direction of the pixels of the image pickup element 22, calculates an average value for each pixel obtained by averaging the reading values of the same pixel $PX_i$ and obtains the temporal correction coefficients of the respective pixels $PX_i$ so that the average value of the reading values of the respective pixels $PX_i$ becomes a target value. That is, the temporal shading correction value calculating unit 200 performs step S2 to step S4, step S10 and step S11 in the flowchart illustrated in FIG. 9.

The temporal shading correction unit 202 performs temporal shading correction on the reading values of the respective pixels $PX_i$ using the temporal shading correction values of the respective pixels $PX_i$ calculated at the temporal shading correction value calculating unit 200. That is, the temporal shading correction unit 202 performs step S5 in the flowchart illustrated in FIG. 9.

The reading position average value calculating unit 204 acquires a reading position average value which is an average value of the reading values obtained by reading the same reading positions $LC_j$ from the reading values of the respective pixels $PX_1$ after the shading correction. That is, the reading position average value calculating unit 204 performs step S6 in the flowchart illustrated in FIG. 9.

The reflectance error calculating unit 206 obtains an average of average values obtained by averaging the reading position average values calculated at the reading position average value calculating unit 204 and calculates a ratio of reflectance (reflectance error) of the respective reading positions $LC_j$ by dividing the average value of the reading position average values of the respective reading positions $LC_j$ by the average of the average values. That is, the reflectance error calculating unit 206 performs step S7 and step S8 in the flowchart illustrated in FIG. 9.

The reading value converting unit 208 converts the reading values of the respective pixels $PX_i$ into new reading values of the respective pixels $PX_i$ by dividing the reading values of the respective pixels $PX_i$ by the ratio of the reflectance calculated at the reflectance error calculating unit 206. That is, the reading value converting unit 208 performs step S9 in the flowchart illustrated in FIG. 9.

The determining unit 210 functions as a counting device which counts the number of repetitions of the repeat operation, and determines whether or not the number of times of the repeat operation reaches the number of repetitions determined in advance. Further, when the number of times of the repeat operation does not reach the number of repetitions determined in advance, the determining unit 210 determines whether or not the temporal correction coefficients of the respective pixels $PX_i$ converge to more reliable values. That is, the determining unit 210 performs step S12 and step S13 in the flowchart illustrated in FIG. 9.

The operation control unit 212 controls whether or not there is repeat operation processing in the temporal shading correction value calculating unit 200, the temporal shading correction unit 202, the reading position average value calculating unit 204, the reflectance error calculating unit 206 and the reading value converting unit 208 based on the determination result of the determining unit 210. That is, the operation control unit 212 controls the repeat operation processing of step S5 to step S11 in the flowchart illustrated in FIG. 9.

Ink Jet Recording Apparatus

Figure 30:
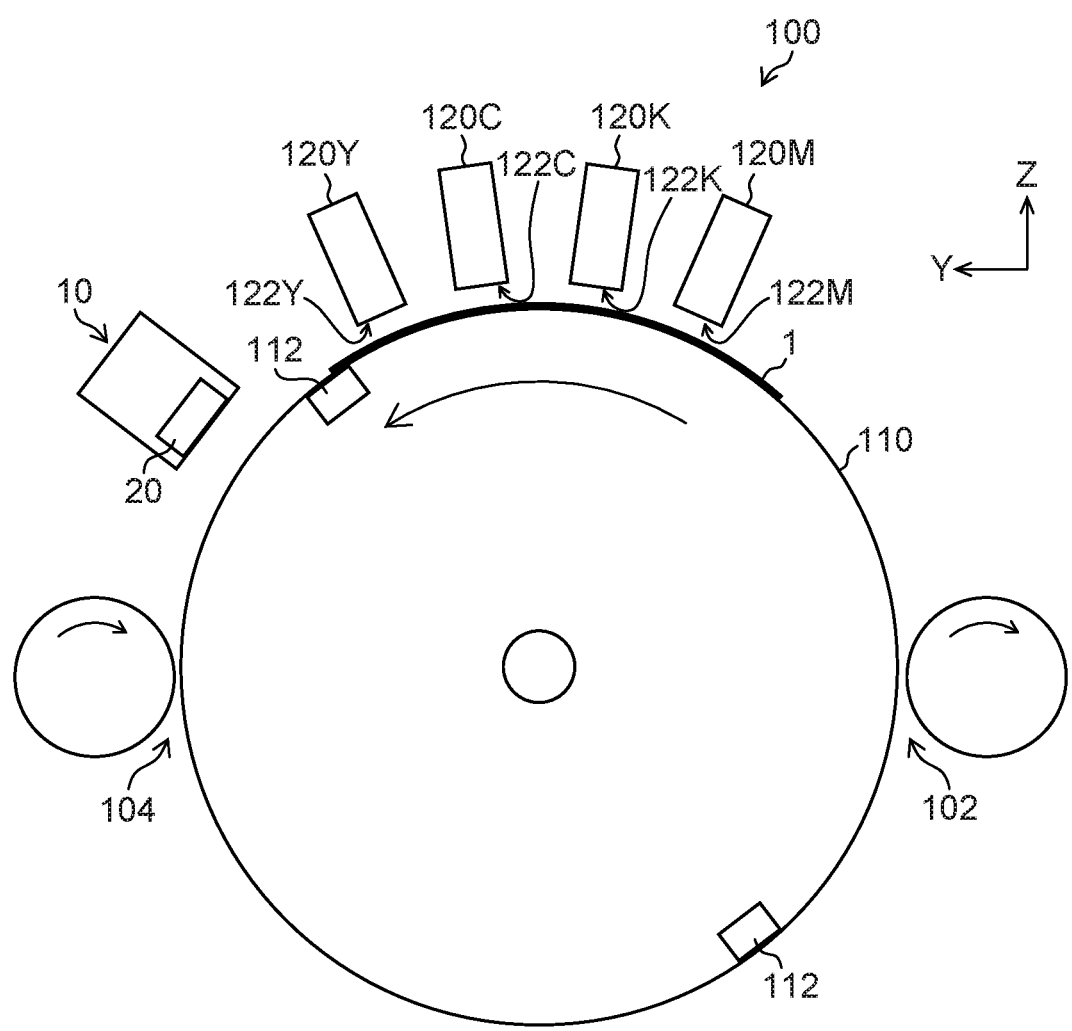
FIG. 30 is a schematic side view illustrating an ink jet recording apparatus.

An ink jet recording apparatus according to the present embodiment will be described. As illustrated in FIG. 30, an ink jet recording apparatus 100 is a single-path type line printer which forms an image on a recording face of the paper 1, and includes a conveyance drum 110, ink jet heads 120M, 120K, 120C, 120Y, or the like.

At positions facing each other across a rotation axis on a conveyance face of the conveyance drum 110, two grippers 112 for gripping a tip of the paper 1 are provided. Further, on the conveyance face of the conveyance drum 110, a number of suction holes (not illustrated) are formed in a predetermined pattern. The tip of the paper 1 introduced from a paper feeding unit 102 is gripped by the gripper 112, and the paper 1 is wrapped around a periphery of the rotating conveyance drum 110. Further, the paper 1 is adsorbed and held around the periphery of the conveyance drum 110 by being suctioned from the suction holes. The conveyance drum 110 conveys the adsorbed and held paper 1 in a paper conveyance direction which is a rotation direction of the conveyance drum 110.

Four ink jet heads 120M, 120K, 120C and 120Y are sequentially disposed from an upstream side at predetermined intervals in the paper conveyance direction of the conveyance drum 110. The ink jet heads 120M, 120K, 120C and 120Y include nozzle faces 122M, 122K, 122C and 122Y respectively facing the conveyance drum 110, and a plurality of nozzles (not illustrated) for respectively ejecting magenta ink (M ink), black ink (K ink), cyan ink (C ink) and yellow ink (Y ink) are formed over the full width of the paper 1 on the respective nozzle faces 122M, 122K, 122C and 122Y.

The respective ink jet heads 120M, 120K, 120C and 120Y are held so that the respective nozzle faces 122M, 122K, 122C and 122Y are parallel to a direction of a tangent at positions facing the respective nozzle faces 122M, 122K, 122C and 122Y on the conveyance face of the conveyance drum 110.

A control unit (not illustrated) which controls recording of the ink jet recording apparatus 100 controls the ink jet heads 120M, 120K, 120C and 120Y, and performs control so that ink is ejected from each nozzle (not illustrated). By this means, an image is formed on the recording face of the paper 1 conveyed by the conveyance drum 110.

On a downstream side of four ink jet heads 120M, 120K, 120C and 120Y in the paper conveyance direction on the conveyance drum 110, a reading apparatus 10 is disposed. The reading apparatus 10 reads the image recorded on the recording face of the paper 1 conveyed by the conveyance drum 110 and converts the image into image data.

The paper 1 from which the image on the recording face is read is further conveyed by the conveyance drum 110 and discharged from a paper discharging unit 104.

The technical scope of the present invention is not limited to the range described in the above-described embodiments. Configurations, or the like, in the embodiments can be combined as appropriate among the embodiments without departing from the scope of the to present invention.

What is claimed is:

1. A correction value calculating method of a reading apparatus comprising an image pickup element in which a plurality of pixels are arranged along a first direction and a shading correction device configured to correct variation of reading values of the plurality of pixels using a correction value for shading correction, the correction value calculating method comprising:
   a reading value acquiring step of acquiring reading values at respective pixels for respective reading positions at both ends of a reading range of a reference member and reading values at respective two or more pixels for respective reading positions in the reading range except the reading positions, and reading values for respective two or more reading positions at the respective pixels while relatively moving the image pickup element and the reference member which becomes a reference for shading correction in the first direction; and
   a correction value calculating step of calculating the correction value for shading correction based on the acquired reading values.

2. The correction value calculating method of the reading apparatus according to claim 1, further comprising:
   a reading value variation acquiring step of acquiring variation of the reading values of the respective pixels by solving a system of equations in which variation of the reading values of the respective pixels based on the acquired reading values and variation of density of the respective reading positions are set at unknowns,
   wherein in the correction value calculating step, the correction value for shading correction is calculated based on the variation of the reading values of the respective pixels.

3. The correction value calculating method of the reading apparatus according to claim 2,
   wherein in the reading value variation acquiring step, variation of the reading values of the respective pixels which averagely satisfies a system of equations in which noise included in the acquired reading values is set at an unknown is acquired using a Newton's method, a bisection method or a least-square method.

4. The correction value calculating method of the reading apparatus according to claim 1,
   wherein in the correction value calculating step, the correction value for shading correction is calculated by performing repeat operation based on the acquired reading values.

5. The correction value calculating method of the reading apparatus according to claim 4,
   wherein the correction value calculating step comprises:
   a temporal correction value calculating step of calculating temporal correction values of the respective pixels based on an average value of the reading values for two or more reading positions at the respective pixels,
   a reflectance error calculating step of calculating reflectance errors of the respective positions based on an average value of a result obtained by performing temporal correction on the reading values for the respective position of the reference member using the temporal correction values;
   a convening step of converting the reading values for two or more reading positions at the respective pixels into new reading values using the reflectance errors; and
   an operation controlling step of causing repeat operation of processing in the temporal correction value calculating step, the reflectance error calculating step and the converting step to be performed, and setting temporal correction values finally calculated through the repeat operation at the correction value for shading correction.

6. The correction value calculating method of the reading apparatus according to claim 5, further comprising:
   a determining step of determining whether or not the temporal correction values converge,
   wherein in the operation controlling step, the repeat operation is caused to be performed until it is determined that the temporal correction values converge.

7. The correction value calculating method of the reading apparatus according to claim 5, further comprising:
   a counting step of counting a number of repetitions of the repeat operation,
   wherein in the operation controlling step, the repeat operation is caused to be performed until the number of repetitions becomes equal to or greater than a threshold.

8. A reading apparatus comprising:
   a reference member which becomes a reference for shading correction;
   an image pickup element in which a plurality of pixels are arranged along at least a first direction;
   a shading correction device configured to correct variation of reading values of the plurality of pixels using a correction value for shading correction;
   a moving device configured to relatively move the reference member and the image pickup element in the first direction;
   a reading value acquiring device configured to cause the image pickup element to read the reference member, and acquire reading values at respective pixels for respective reading positions at both ends of a reading range of the reference member, reading values at respective two or more pixels for respective reading positions in the reading range except the reading positions, and reading values for respective two or more reading positions at the respective pixels; and
   a correction value calculating device configured to calculate the correction value for shading correction based on the acquired reading values.

9. The reading apparatus according to claim 8,
   wherein in the image pickup element, a plurality of pixels are arranged in two dimensions along the first direction and a second direction different from the first direction, and
   the moving device relatively moves the reference member and the image pickup element along the first direction or the second direction.

10. The reading apparatus according to claim 8, further comprising:
    a light source configured to illuminate the reference member with light.

11. The reading apparatus according to claim 8, further comprising:
    a storage device configured to store the correction value for shading correction.

12. An ink jet recording apparatus, comprising:
an ink jet head; and
the reading apparatus according to claim 8 configured to read an image recorded by the ink jet head.

13. A non-transitory tangible computer-readable recording medium including instructions stored thereon, such that when the instructions are read and executed by a computer, the computer is configured to perform a correction value calculating method of a reading apparatus comprising an image pickup element in which a plurality of pixels are arranged along a first direction and a shading correction device configured to correct variation of reading values of the plurality of pixels using a correction value for shading correction, the correction value calculating method comprising:

a reading value acquiring step of acquiring reading values at respective pixels for respective reading positions at both ends of a reading range of a reference member and reading values at respective two or more pixels for respective reading positions in the reading range except the reading positions and reading values for respective two or more reading positions at the respective pixels while relatively moving the image pickup element and the reference member which becomes a reference for shading correction in the first direction; and a correction value calculating step of calculating the correction value for shading correction based on the acquired reading values.

* * * * *